(12) United States Patent
Fukuoka et al.

(10) Patent No.: US 12,280,443 B2
(45) Date of Patent: Apr. 22, 2025

(54) LASER MACHINING DEVICE

(71) Applicant: HAMAMATSU PHOTONICS K.K., Hamamatsu (JP)

(72) Inventors: Hirotake Fukuoka, Hamamatsu (JP); Yuta Kondoh, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 608 days.

(21) Appl. No.: 17/256,836

(22) PCT Filed: Jul. 1, 2019

(86) PCT No.: PCT/JP2019/026186
§ 371 (c)(1),
(2) Date: Dec. 29, 2020

(87) PCT Pub. No.: WO2020/009079
PCT Pub. Date: Jan. 9, 2020

(65) Prior Publication Data
US 2021/0370437 A1    Dec. 2, 2021

(30) Foreign Application Priority Data
Jul. 5, 2018    (JP) ................. 2018-128474

(51) Int. Cl.
*B23K 26/03*    (2006.01)
*B23K 26/046*    (2014.01)
(Continued)

(52) U.S. Cl.
CPC .......... *B23K 26/032* (2013.01); *B23K 26/046* (2013.01); *B23K 26/0643* (2013.01); *B23K 26/53* (2015.10)

(58) Field of Classification Search
CPC ..... B23K 26/046; B23K 26/53; B23K 26/032
See application file for complete search history.

(56) References Cited

U.S. PATENT DOCUMENTS 9,873,628 B1    1/2018  Haloui et al.
2006/0144828 A1*  7/2006  Fukumitsu ............. B28D 1/221
                                            219/121.67
(Continued)

FOREIGN PATENT DOCUMENTS

CN    101426611 A    5/2009
CN    102227286 A    10/2011
(Continued)

OTHER PUBLICATIONS

International Preliminary Report on Patentability mailded Jan. 14, 2021 for PCT/JP2019/026186.

*Primary Examiner* — John J Norton
*Assistant Examiner* — Franklin Jefferson Wang
(74) *Attorney, Agent, or Firm* — Faegre Drinker Biddle & Reath LLP

(57) ABSTRACT

A laser processing device including a laser light source that outputs laser light, a measurement light source that outputs measurement light, a converging unit that converges the laser light toward an object to be processed to form a first converging point and converges the measurement light toward the object to be processed to form a second converging point, a measurement part for measuring displacement of an entrance surface according to reflected light of the measurement light on the entrance surface of the laser light and the measurement light in the object to be processed, and an adjustment unit that adjusts a position of the first converging point in a direction intersecting the entrance surface according to a measurement result of the displacement of the entrance surface.

5 Claims, 18 Drawing Sheets

(51) Int. Cl.
*B23K 26/06* (2014.01)
*B23K 26/53* (2014.01)

(56) References Cited

U.S. PATENT DOCUMENTS

| | | | | |
|---|---|---|---|---|
| 2011/0000897 | A1* | 1/2011 | Nakano | H01L 23/544 |
| | | | | 219/121.72 |
| 2011/0300691 | A1* | 12/2011 | Sakamoto | B23K 26/0622 |
| | | | | 257/E21.599 |
| 2014/0021177 | A1* | 1/2014 | Koch | B23K 26/361 |
| | | | | 219/121.69 |
| 2014/0293388 | A1* | 10/2014 | Matsumoto | G03H 1/2294 |
| | | | | 359/9 |
| 2016/0372349 | A1* | 12/2016 | Hyakumura | B23K 26/048 |

FOREIGN PATENT DOCUMENTS

| | | | |
|---|---|---|---|
| CN | 102725096 | A | 10/2012 |
| CN | 105189025 | A | 12/2015 |
| CN | 107272192 | A | 10/2017 |
| JP | 2010-125507 | A | 6/2010 |
| JP | 2012194085 | A * | 10/2012 |
| JP | 2014-205168 | A | 10/2014 |
| JP | 5743123 | B1 | 7/2015 |
| JP | 2017064747 | A * | 4/2017 |
| JP | 2018-098464 | A | 6/2018 |
| KR | 1020170010760 | A | 2/2017 |
| TW | 201105444 | A1 | 2/2011 |
| TW | 201538260 | A | 10/2015 |
| TW | 201808506 | A | 3/2018 |

* cited by examiner

Fig.16
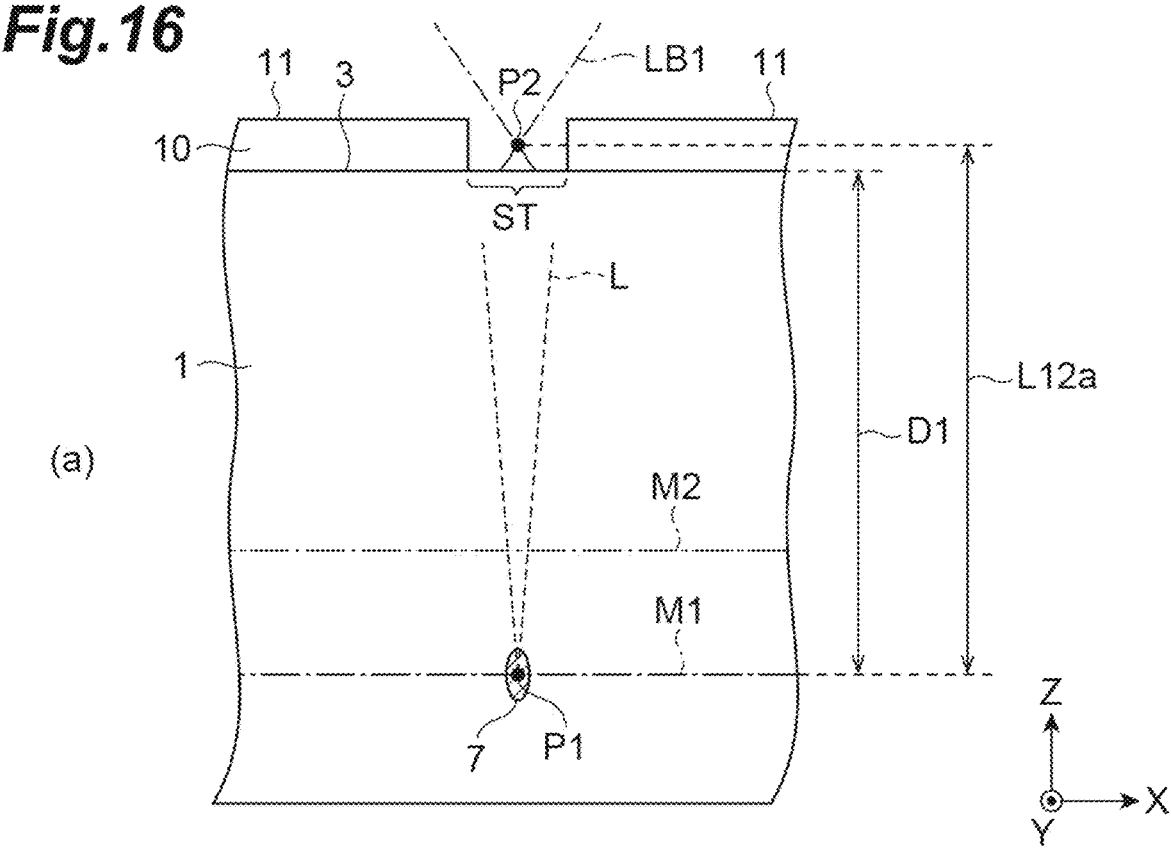
(a)
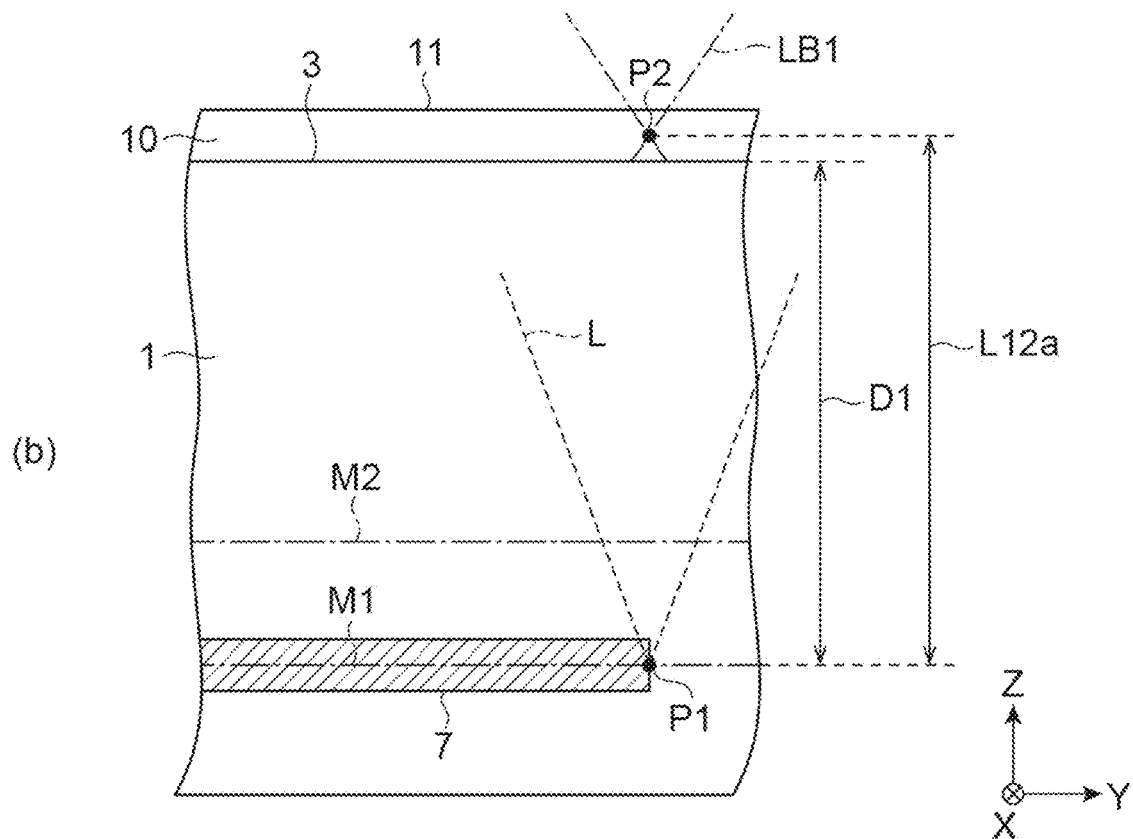
(b)

*Fig.17*
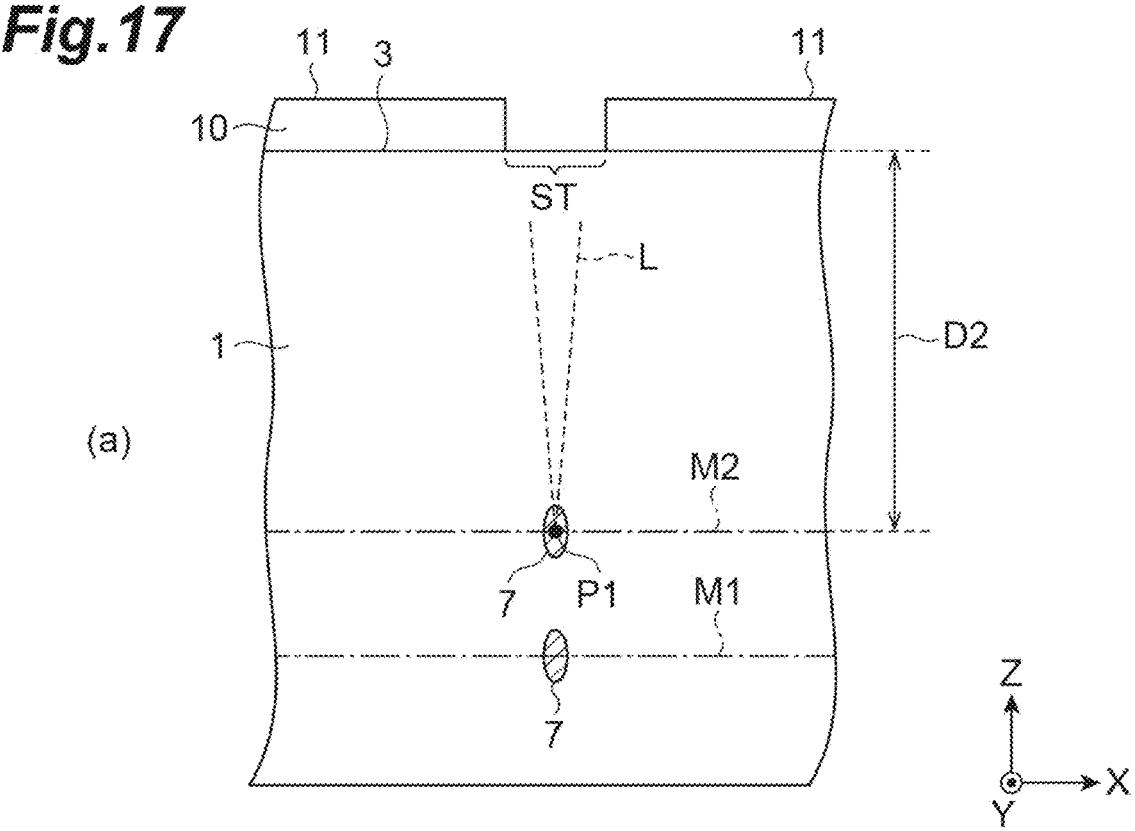
(a)
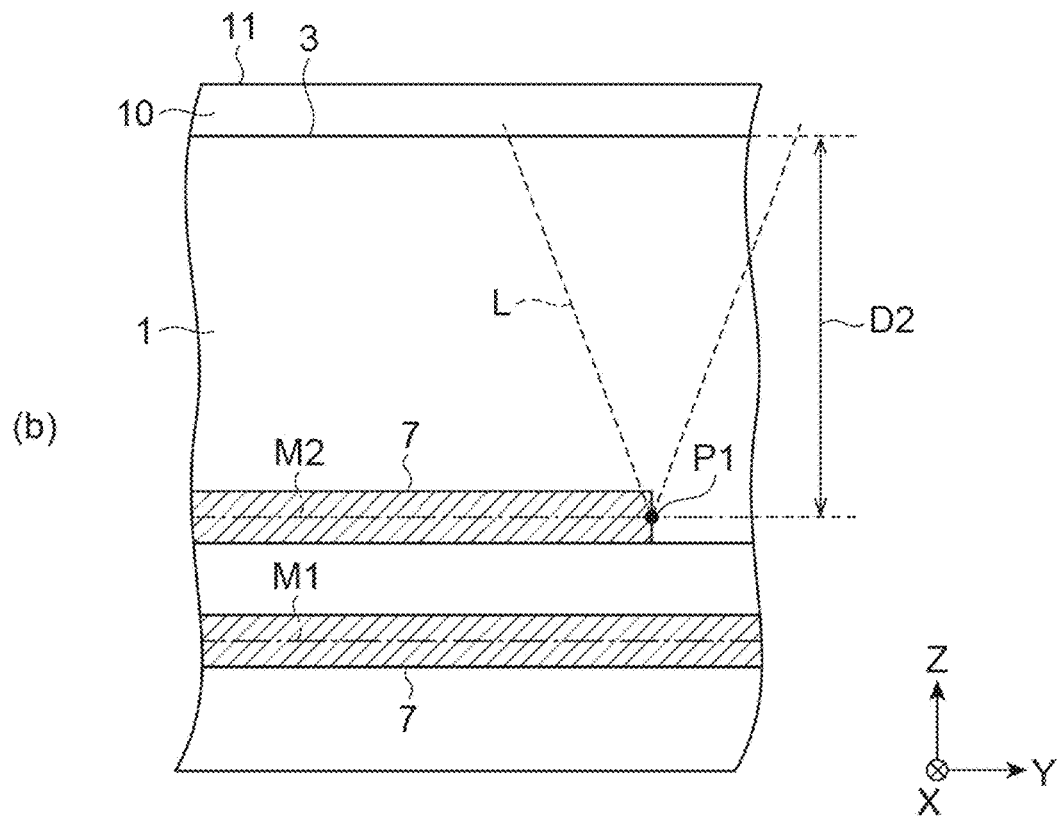
(b)

LASER MACHINING DEVICE

TECHNICAL FIELD

One aspect of the present disclosure relates to a laser processing device.

BACKGROUND ART

Patent Literature 1 describes a laser dicing device. This laser dicing device includes a stage for moving a wafer, a laser head for irradiating the wafer with laser light, and a control unit for controlling respective units. The laser head has a laser light source that emits a processing laser light for forming a modified region inside the wafer, a dichroic mirror and a condenser lens arranged in this order on a light path of the processing laser light, and an AF device. The AF device emits AF laser light for detecting displacement in a Z direction (wafer thickness direction) from a reference position of a surface of the wafer, receives reflected light of the AF laser light reflected by the surface of the wafer, and detects displacement in the Z direction from the reference position of the surface of the wafer based on the received reflected light.

CITATION LIST

Patent Literature

Patent Literature 1: Japanese Patent No. 5743123

SUMMARY OF INVENTION

Technical Problem

By the way, a range in which displacement of a light entrance surface can be suitably measured is limited to a predetermined range along an optical axis of measurement light for autofocus. Thus, when a distance between a converging point of the processing laser light and a converging point of the measurement light is constant, a processing depth range in which processing (autofocus processing) by the laser light can be performed while performing autofocus is also limited.

On the other hand, the laser dicing device further includes a focus lens group for changing the converging point of the AF laser light independently from the converging point of the processing laser light in the wafer thickness direction. The focus lens group is arranged at a position that is on the light path of the AF laser light and is independent from the light path of the processing laser light. The focus lens group includes a fixed lens and a movable lens arranged in this order from the wafer side. In the laser dicing device, the movable lens is mechanically moved by using an actuator, so that the converging point of the AF laser light is movable in a state where a Z directional position of the converging point of the processing laser light is fixed. As a result, the range in which autofocus processing is possible is thereby enlarged.

As described above, in the above technical field, it is desired that the converging point of the processing laser light and the converging point of the measurement light can be changed independently to enlarge the range in which autofocus processing is possible. However, a complicated configuration, such as using a plurality of lenses that require highly accurate optical axis adjustment and mechanically moving the lenses by an actuator, as in the laser dicing device is not practical in fulfilling the above requirements.

Thus, one aspect of the present disclosure is to provide a laser processing device capable of enlarging a range in which autofocus processing is possible with a simpler configuration.

Solution to Problem

The laser processing device according to one aspect of the present disclosure is a laser processing device that applies laser light to an object to be processed along a line to process, to perform laser processing on the object to be processed along the line to process. The laser processing device includes a laser light source that outputs the laser light, a measurement light source that outputs measurement light, a converging unit that converges the laser light toward the object to be processed to form a first converging point and converges the measurement light toward the object to be processed to form a second converging point, a measurement part configured to measure displacement of an entrance surface according to reflected light of the measurement light on the entrance surface of the laser light and the measurement light in the object to be processed, an adjustment unit that adjusts a position of the first converging point in a direction intersecting the entrance surface according to a measurement result of the displacement of the entrance surface, a spatial light modulator configured to modulate the laser light according to a modulation pattern between the laser light source and the converging unit, and a controller that controls the modulation pattern presented to the spatial light modulator. In this laser processing device, the controller causes the spatial light modulator to present the modulation pattern including a converging position change pattern for changing a position of the first converging point in the direction intersecting the entrance surface according to a distance between the first converging point and the second converging point and a processing depth of the laser processing from the entrance surface.

In this laser processing device, the converging unit converges the laser light output from the laser light source and the measurement light output from the measurement light source toward the object to be processed. Thus, the first converging point of the laser light is formed, and the second converging point of the measurement light is formed. The measurement part measures the displacement of the entrance surface based on the reflected light of the measurement light on the entrance surface. In addition, the adjustment unit adjusts the position of the first converging point in the direction intersecting the entrance surface according to the measurement result. That is, in this laser processing device, autofocus processing can be performed. Here, in this laser processing device, a spatial light modulator that modulates the laser light between the laser light source and the converging unit is used. The spatial light modulator presents the modulation pattern including a converging position change pattern for changing the position of the first converging point in the direction intersecting the entrance surface based on the distance between the first and second converging points and a desired processing depth under control of the controller. Thus, the first converging point of processing laser light can be changed independently of the second converging point of the measurement light. As described above, according to this laser processing device, a range in which autofocus processing is possible can be enlarged with a simple configuration without requiring a complicated configuration such as mechanically movement of a lens group.

Here, an object (for example, a wafer) in which a plurality of device portions aligned so as to be separated from each other are formed on the surface may be an object to be processed for laser processing. In that case, the line to process is set between the device portions adjacent to each other, and a surface on which the device portion is formed may be the entrance surface of the laser light and the measurement light. In this case, in order to perform highly accurate autofocus processing, while the displacement of the entrance surface can be suitably measured so that the measurement light does not interfere with the device portion, it is necessary to adjust the first converging point of the laser light so that the first converging point is located to a desired processing depth.

Thus, in the laser processing device according to one aspect of the present disclosure, a plurality of device portions aligned so as to be separated from each other along the entrance surface may be formed on the entrance surface of the object to be processed, the line to process may be set so as to pass between the device portions adjacent to each other, and the controller may cause the spatial light modulator to present the modulation pattern including the converging position change pattern when the measurement light interferes with the device portion in an initial state in which the first converging point is arranged at the processing depth and a spot of the measurement light is arranged on the entrance surface between the device portions adjacent to each other. In this case, while preventing the measurement light from interfering with the device portion, it is possible to adjust the position of the first converging point of the laser light to the desired processing depth and to perform highly accurate autofocus processing.

At this time, in the laser processing device according to one aspect of the present disclosure, the controller may move the second converging point so that the measurement light does not interfere with the device portion when the measurement light interferes with the device portion in the initial state, may calculate a difference between the first converging point, shifted from the processing depth due to the movement of the second converging point, and the processing depth, and may cause the spatial light modulator to present the modulation pattern including the converging position change pattern according to the difference.

In the laser processing device according to one aspect of the present disclosure, when roughness of the entrance surface is equal to or greater than a certain level, the controller may cause the spatial light modulator to present the modulation pattern including the converging position change pattern to enlarge or reduce the distance so as to enlarge a spot size of the measurement light on the entrance surface while maintaining the first converging point at the processing depth. As described above, when the roughness of the entrance surface is equal to or greater than a certain level, if the spot of the measurement light arranged on the entrance surface is small, a measurement error tends to be large due to an influence of the roughness. On the other hand, in this case, when the roughness of the entrance surface is equal to or greater than a certain level, the spot size of the measurement light is increased while maintaining the first converging point of the laser light at the processing depth. Thus, even when the roughness of the entrance surface is equal to or greater than a certain level, it is possible to perform highly accurate autofocus processing.

In the laser processing device according to one aspect of the present disclosure, the controller may cause the spatial light modulator to present the modulation pattern formed by superimposing a correction pattern for aberration correction of the laser light and the converging position change pattern. As described above, when the spatial light modulator is used to change the position of the first converging point of the laser light, it is possible to change the position at the same time as the aberration correction, and the range in which autofocus processing is possible can be enlarged with a simpler configuration.

Advantageous Effects of Invention

According to one aspect of the present disclosure, it is possible to provide a laser processing device capable of enlarging a range in which autofocus processing is possible with a simpler configuration.

BRIEF DESCRIPTION OF DRAWINGS

FIG. 16 is a schematic cross-sectional view showing a series of steps of the AF processing.

FIG. 17 is a schematic cross-sectional view showing a series of steps of the AF processing.

DESCRIPTION OF EMBODIMENTS

Figure 1:
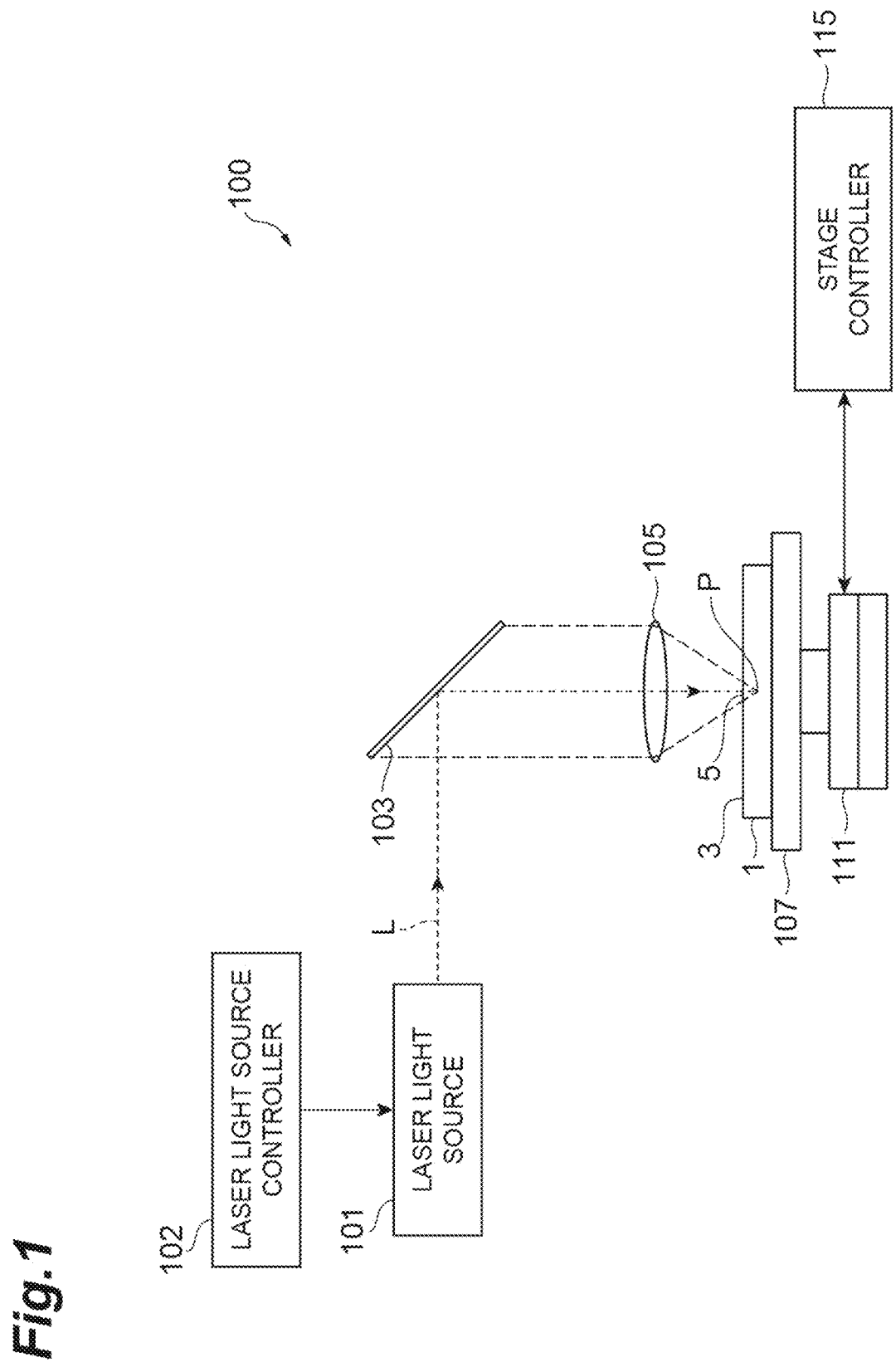
FIG. 1 is a schematic configuration diagram of a laser processing device used for forming a modified region.

Hereinafter, an embodiment of a laser processing device will be described with reference to the drawings. In the description of the drawings, the same elements or corresponding elements are denoted by the same reference numerals, and overlapping explanations may be omitted. In the following, an orthogonal coordinate system defined by the X-axis, the Y-axis, and the Z-axis may be illustrated and used for explanation.

In a laser processing device according to the embodiment, laser light is converged at an object to be processed to form a modified region within the object to be processed along a line to cut. Therefore, formation of the modified region will be described at first with reference to FIGS. 1 to 6.

As illustrated in FIG. 1, a laser processing device 100 includes a laser light source 101 configured to cause laser light L to oscillate in a pulsating manner, a dichroic mirror 103 arranged so as to change a direction of the optical axis (optical path) of the laser light L by 90°, and a converging lens 105 configured to converge the laser light L. The laser processing device 100 further includes a support table 107 configured to support an object to be processed 1 that is an object to which the laser light L converged by the converging lens 105 is emitted, a stage 111 that is a moving mechanism configured to move the support table 107, a laser light source controller 102 configured to control the laser light source 101 in order to adjust the output, pulse width, pulse waveform, and the like of the laser light L, and a stage controller 115 configured to control the movement of the stage 111.

In the laser processing device 100, the laser light L emitted from the laser light source 101 changes the direction of its optical axis by 90° with the dichroic mirror 103 and then is converged by the converging lens 105 within the object to be processed 1 mounted on the support table 107. At the same time, the stage 111 is moved, so that the object to be processed 1 moves with respect to the laser light L along a line to cut 5. Thus, a modified region along the line to cut 5 is formed in the object to be processed 1. While the stage 111 is moved here for relatively moving the laser light L, the converging lens 105 may be moved instead or together therewith.

Figure 2:
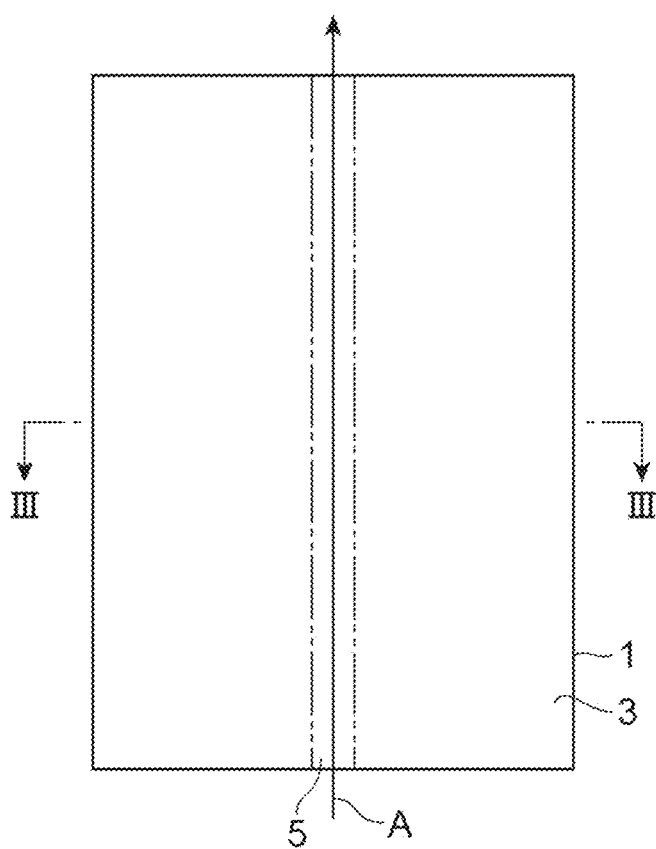
FIG. 2 is a plan view of an object to be processed for which the modified region is formed.
Figure 3:
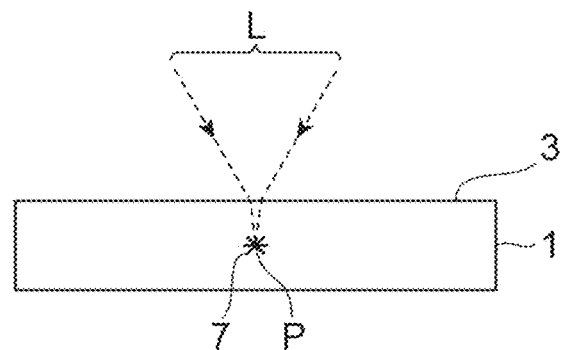
FIG. 3 is a sectional view of the object to be processed taken along the line III-III of FIG. 2.
Figure 4:
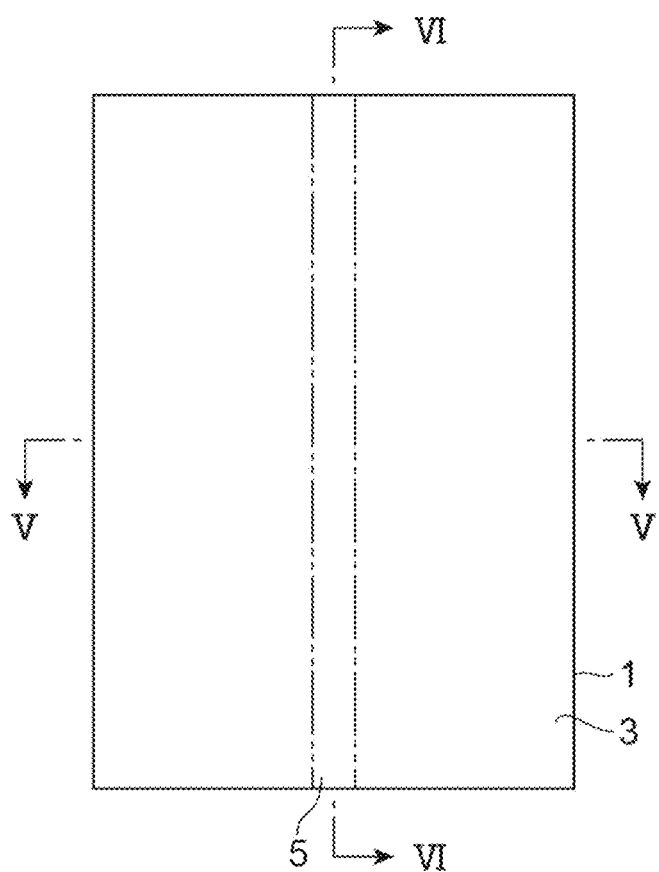
FIG. 4 is a plan view of the object to be processed after laser processing.
Figure 5:
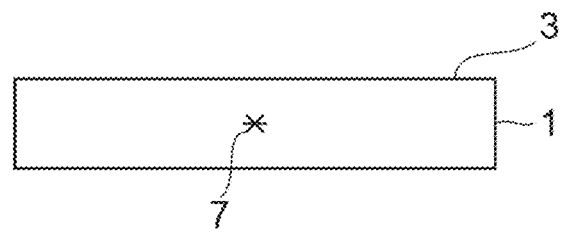
FIG. 5 is a sectional view of the object to be processed taken along the line V-V of FIG. 4.
Figure 6:
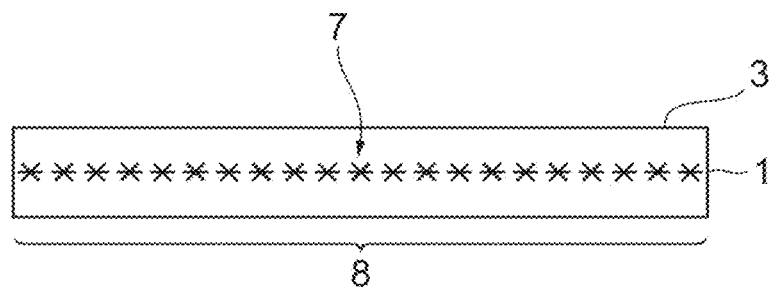
FIG. 6 is a sectional view of the object to be processed taken along the line VI-VI of FIG. 4.

Employed as the object to be processed 1 is a planar member (for example, a substrate or a wafer), examples of which include semiconductor substrates formed of semiconductor materials and piezoelectric substrates formed of piezoelectric materials. As illustrated in FIG. 2, in the object to be processed 1, the line to cut 5 is set for cutting the object to be processed 1. The line to cut 5 is a virtual line extending straight. In a case where a modified region is formed within the object to be processed 1, the laser light L is relatively moved along the line to cut 5 (that is, in the direction of arrow A in FIG. 2) while a converging point (converging position) P is set within the object to be processed 1 as illustrated in FIG. 3. Thus, a modified region 7 is formed within the object to be processed 1 along the line to cut 5 as illustrated in FIGS. 4, 5 and 6, and the modified region 7 formed along the line to cut 5 becomes a cutting start region 8. The line to cut 5 corresponds to an irradiation schedule line.

The converging point P is a position at which the laser light L is converged. The line to cut 5 may be curved instead of being straight, a three-dimensional one combining them, or one specified by coordinates. The line to cut 5 may be one actually drawn on a front surface 3 of the object to be processed 1 without being restricted to the virtual line. The modified region 7 may be formed either continuously or intermittently. The modified region 7 may be formed in either rows or dots, and only needs to be formed at least within the object to be processed 1, on the front surface 3, or on a back surface. A crack may be formed from the modified region 7 as a start point, and the crack and the modified region 7 may be exposed at an outer surface (the front surface 3, the back surface, or an outer peripheral surface) of the object to be processed 1. A laser light entrance surface in forming the modified region 7 is not limited to the front surface 3 of the object to be processed 1 but may be the back surface of the object to be processed 1.

Incidentally, in a case where the modified region 7 is formed within the object to be processed 1, the laser light L is transmitted through the object to be processed 1 and is particularly absorbed near the converging point P located within the object to be processed 1. Thus, the modified region 7 is formed in the object to be processed 1 (that is, internal absorption type laser processing). In this case, the front surface 3 of the object to be processed 1 hardly absorbs the laser light L and thus does not melt. On the other hand, in a case where the modified region 7 is formed on the front surface 3 or the back surface of the object to be processed 1, the laser light L is particularly absorbed near the converging point P located on the front surface 3 or the back surface, and removal portions such as holes and grooves are formed (surface absorption type laser processing) by being melted from the front surface 3 or the back surface and removed.

The modified region 7 is a region in which density, refractive index, mechanical strength and other physical characteristics are different from the surroundings. Examples of the modified region 7 include a molten processed region (meaning at least one of a region re-solidified after having been once molten, a region in the molten state, and a region in the process of re-solidifying from the molten state), a crack region, a dielectric breakdown region, a refractive index changed region, and a mixed region thereof. Other examples of the modified region 7 include a region where the density of the modified region 7 has changed compared to the density of an unmodified region in a material of the object to be processed 1, and a region formed with a lattice defect. In a case where the material of the object to be processed 1 is 1 crystal silicon, the modified region 7 can also be said to be a high dislocation density region.

The molten processed region, refractive index changed region, region where the density of the modified region 7 has changed compared to the density of the unmodified region, and region formed with the lattice defect may further incorporate the crack (cracking or microcrack) therewithin or at an interface between the modified region 7 and the unmodified region. The incorporated crack may be formed over the whole surface of the modified region 7 or in only a portion or a plurality of portions thereof. The object to be processed 1 includes a substrate made of a crystalline material having a crystal structure. For example, the object to be processed 1 includes a substrate formed of at least one of gallium nitride (GaN), silicon (Si), silicon carbide (SiC), $LiTaO_3$, and sapphire ($Al_2O_3$). In other words, the object to be processed 1 includes, for example, a gallium nitride substrate, a silicon substrate, a SiC substrate, a $LiTaO_3$ substrate, or a sapphire substrate. The crystalline material may be either an anisotropic crystal or an isotropic crystal. In addition, the object to be processed 1 may include a substrate made of a non-crystalline material having a non-crystalline structure (amorphous structure), and may include a glass substrate, for example.

In the embodiment, the modified region 7 can be formed by forming a plurality of modified spots (processing marks) along the line to cut 5. In this case, the plurality of modified spots gathers to be the modified region 7. Each of the modified spots is a modified portion formed by a shot of one pulse of pulsed laser light (that is, laser irradiation of one pulse:laser shot). Examples of the modified spots include crack spots, molten processed spots, refractive index changed spots, and those in which at least one of them is mixed. As for the modified spots, their sizes and lengths of the crack occurring therefrom can be controlled as necessary in view of the required cutting accuracy, the required flatness of cut surfaces, the thickness, kind, and crystal orientation of the object to be processed 1, and the like. In addition, in the embodiments, the modified spots can be formed as the modified region 7, along the line to cut 5.

Figure 7:
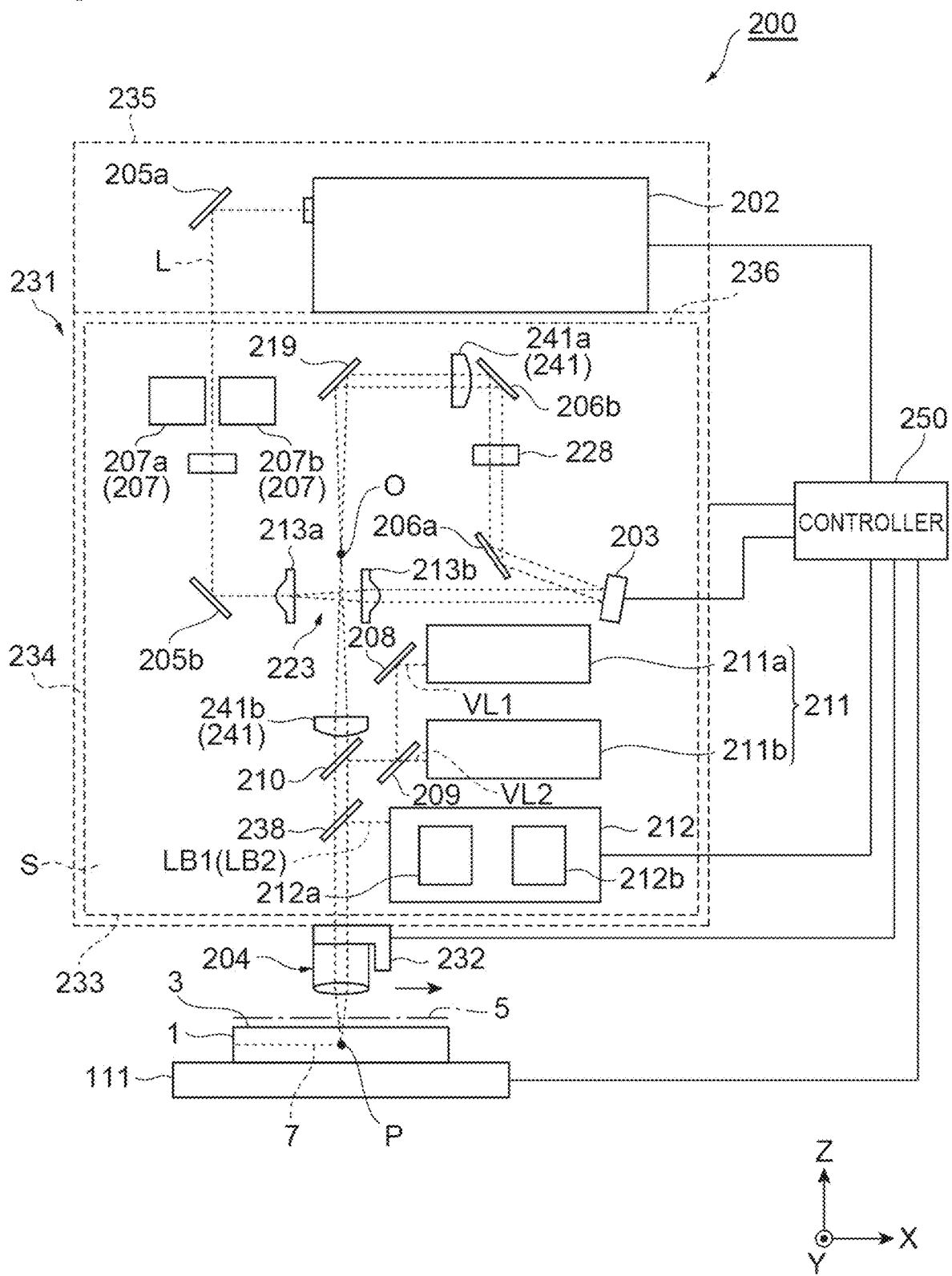
FIG. 7 is a schematic configuration diagram showing a laser processing device according to the present embodiment.

Next, the laser processing device according to the present embodiment will be described. FIG. 7 is a schematic configuration diagram showing a laser processing device according to the present embodiment. As shown in FIG. 7, a laser processing device 200 applies the laser light L while setting the converging point P within the object to be processed 1 on the stage 111 and thereby forming the modified region 7 (performing laser processing), which is a start point of cutting, along the line to cut (line to process) 5 of the object to be processed 1. The laser processing device 200 includes a laser light source 202, a reflective spatial light modulator (spatial light modulator) 203, a 4f optical system 241 and a converging optical system (converging unit) 204, within a housing 231.

The laser light source 202 outputs the laser light L. As the laser light source 202, for example, a fiber laser is used. Here, the laser light source 202 is secured to a top plate 236 of the housing 231 with a screw and the like so as to emit the laser light L horizontally (X-axis direction) (in a so-called horizontally laid state).

The reflective spatial light modulator 203 modulates the laser light L emitted from the laser light source 202, and a LCOS (Liquid Crystal on Silicon)-SLM(Spatial Light Modulator) is used, for example. The reflective spatial light modulator 203 modulates the laser light L horizontally incident thereon, while reflecting it obliquely with respect to the horizontal direction.

Figure 8:
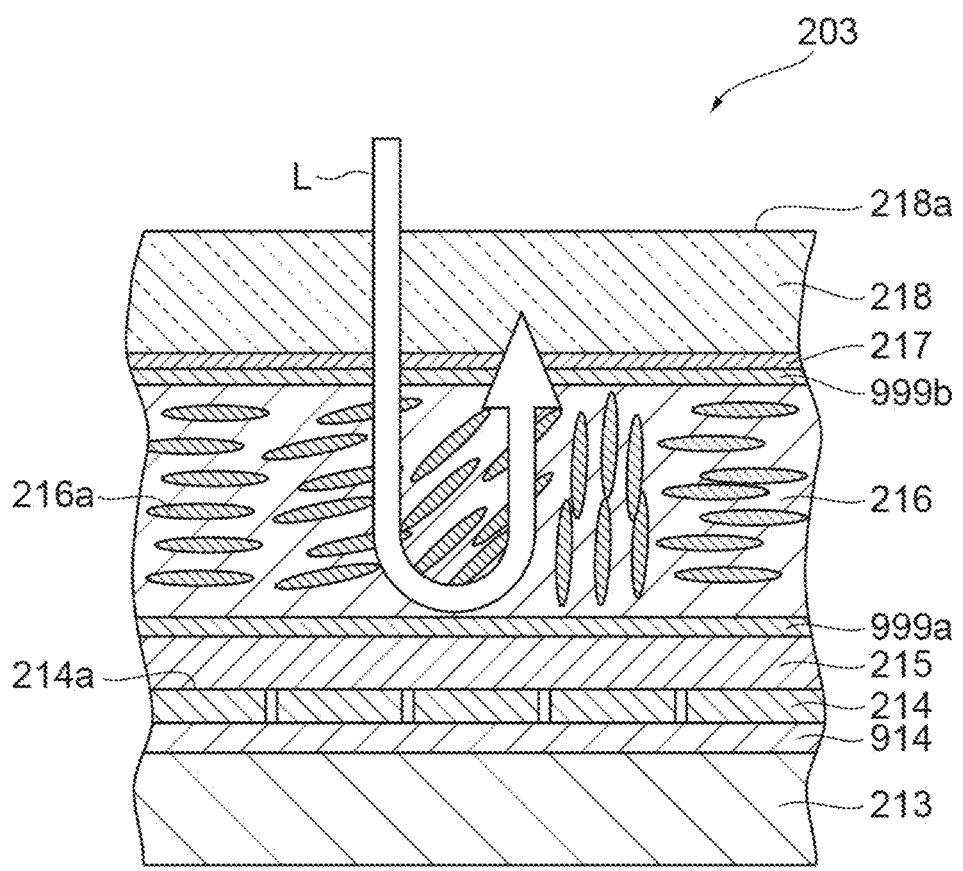
FIG. 8 is an exploded perspective view of a reflective spatial light modulator in the laser processing device of FIG. 7.

FIG. 8 is an exploded perspective view of the reflective spatial light modulator in the laser processing device of FIG. 7. As shown in FIG. 8, the reflective spatial light modulator 203 includes a silicon substrate 213, a drive circuit layer 914, a plurality of pixel electrodes 214, a reflective film 215 such as a dielectric multilayer mirror, an alignment film 999a, a liquid crystal layer 216, an alignment film 999b, a transparent conductive film 217, and a transparent substrate 218 such as a glass substrate, which are stacked in this order. The transparent substrate 218 includes a front face 218a along a predetermined plane. The front face 218a of the transparent substrate 218 constitutes a front face of the reflective spatial light modulator 203. The transparent substrate 218 is made of a light transmitting material such as glass, for example. The transparent substrate 218 transmits therethrough the laser light L having a predetermined wavelength incident thereon from the front face 218a of the reflective spatial light modulator 203 to the inside of the reflective spatial light modulator 203. The transparent conductive film 217 is formed on a rear face of the transparent substrate 218. The transparent conductive film 217 includes a conductive material (for example, ITO) that transmits therethrough the laser light L.

The plurality of pixel electrodes 214 is arranged in a matrix on the silicon substrate 213 along the transparent conductive film 217. The plurality of pixel electrodes 214 are made of a metal material such as aluminum, for example. A front face 214a of the plurality of pixel electrodes 214 is processed flat and smooth. The plurality of pixel electrodes 214 are driven by an active matrix circuit provided in the drive circuit layer 914.

The active matrix circuit is provided between the plurality of pixel electrodes 214 and the silicon substrate 213. The active matrix circuit controls an applied voltage to each of the pixel electrodes 214 in accordance with a light image to be output from the reflective spatial light modulator 203. For example, the active matrix circuit has a first driver circuit for controlling the applied voltage for pixel rows aligning in one direction along the front face 218a, and a second driver circuit for controlling the applied voltage for pixel rows aligning in another direction orthogonal to the one direction and along the front face 218a. Such an active matrix circuit is configured so that a predetermined voltage is applied to the pixel electrode 214 of a pixel specified by the driver circuits, by a controller 250 (see FIG. 7).

The alignment films 999a, 999b are arranged on both end surfaces of the liquid crystal layer 216, respectively, so as to align a group of liquid crystal molecules in a fixed direction. The alignment films 999a, 999b are made of a polymer material such as polyimide. The surfaces of the alignment films 999a and 999b coining into contact with the liquid crystal layer 216 are subjected to rubbing, and the like.

The liquid crystal layer 216 is arranged between the plurality of pixel electrodes 214 and the transparent conductive film 217. The liquid crystal layer 216 modulates the laser light L according to an electric field formed between each of the pixel electrodes 214 and the transparent conductive film 217. That is, when a voltage is applied to the pixel electrodes 214 by the active matrix circuit of the drive circuit layer 914, an electric field is formed between the transparent conductive film 217 and the pixel electrodes 214, and the alignment direction of liquid crystal molecules 216a changes according to a magnitude of the electric field formed in the liquid crystal layer 216. When the laser light L enters the liquid crystal layer 216 through the transparent substrate 218 and the transparent conductive film 217, the laser light L is modulated by the liquid crystal molecules 216a while passing through the liquid crystal layer 216, and reflected by the reflective film 215, and then modulated again by the liquid crystal layer 216, and emitted.

At this time, the voltage applied to each of the pixel electrodes 214 is controlled by the controller 250 (see FIG. 7), and, in accordance with the voltage, a refractive index changes in a portion sandwiched between the transparent conductive film 217 and each of the pixel electrodes 214 in the liquid crystal layer 216 (the refractive index of the liquid crystal layer 216 changes at a position corresponding to each pixel). Due to the change in the refractive index, the phase of the laser light L can be changed for each pixel of the liquid crystal layer 216 in accordance with the voltage applied. That is, phase modulation corresponding to the hologram pattern can be applied by the liquid crystal layer 216 for each pixel. The wavefront is adjusted of the laser light L that enters and is transmitted through the modulation pattern, and shifts occur in phases of components of individual rays constituting the laser light L in a direction orthogonal to their traveling direction. Therefore, the laser light L can be modulated (for example, intensity, amplitude, phase, and polarization of the laser light L can be modulated) by appropriately setting the modulation pattern to be displayed in the reflective spatial light modulator 203 under the control of the controller 250.

Returning to FIG. 7, the 4f optical system 241 adjusts the wavefront form of the laser light L modulated by the reflective spatial light modulator 203. The 4f optical system 241 has first and second lenses 241a, 241b The lenses 241a, 241b are arranged between the reflective spatial light modulator 203 and the converging optical system 204 such that a distance between the reflective spatial light modulator 203 and the first lens 241a equals a focal length f1 of the first lens 241a, a distance between the converging optical system 204 and the lens 241b equals a focal length f2 of the lens 241b, a distance between the first and second lenses 241a, 241b equals f1+f2, and the first and second lenses 241a, 241b constitute a double-telecentric optical system.

In this 4f optical system 241, phase modulation is performed by the reflective spatial light modulator 203, the laser light L having a wavefront in which aberration of the laser light L that has a predetermined beam diameter and is converged is equal to or less than predetermined aberration can be converged by the converging optical system 204. A ratio of the focal length f1 to the focal length f2 is n:1 (n is a real number), and the beam diameter and wavefront of the laser light L entering the converging optical system 204 are respectively 1/n times and n times the beam diameter and wavefront of the laser light reflected by the reflective spatial light modulator 203. This 4f optical system 241 can inhibit the laser light L modulated (corrected) by the reflective spatial light modulator 203 from changing its wavefront form through spatial propagation and thereby increasing aberrations. In the 4f optical system 241 in this case, the laser light L is adjusted so that the laser light L entering the converging optical system 204 becomes parallel light.

The converging optical system 204 converges the laser light L, modulated by the reflective spatial light modulator 203, into the object to be processed 1. The converging optical system 204 includes a plurality of lenses and is placed on a bottom plate 233 of the housing 231 while interposing therebetween a drive unit (adjustment unit) 232 including a piezoelectric device and the like.

The laser processing device 200 also includes a surface observation unit 211 and an AF (autofocus) unit 212 within the housing 231. The surface observation unit 211 is for observing the front surface 3 of the object to be processed 1. The surface observation unit 211 has at least an observation light source 211a for emitting visible light VL1, a detector 211b for receiving and detecting reflected light VL2 of the visible light VL1 reflected by the front surface 3 of the object to be processed 1, and a dichroic mirror 210 that transmits therethrough the laser light L and reflects the visible light VL1 and the reflected light VL2. The dichroic mirror 210 is arranged between the 4f optical system 241 and the converging optical system 204 in the optical path of the laser light L, and is arranged so as to change the directions of the visible light VL1 and the reflected light VL2 by 90°.

In this surface observation unit 211, the visible light VL1 emitted from the observation light source 211a is sequentially reflected by the mirror 208 and the dichroic mirrors 209, 210, and is converged by the converging optical system 204. The reflected light VL2 reflected on the front face 2 of the object to be processed 1 is converged by the converging optical system 204, reflected by the dichroic mirror 210, and transmitted through the dichroic mirror 209.

The AF unit 212 is used for accurately setting the converging point (first converging point) P of the laser light L at a predetermined distance from the front surface 3, for example even when a displacement (undulation) in a thickness direction (Z-axis direction) is present on the front surface 3 of the object to be processed 1. Specifically, the AF unit 212 emits AF laser light (measurement light) LB1 to the object to be processed 1 and receives and detects reflected light LB2 of the AF laser light LB1 reflected on the front surface 3 of the object to be processed 1 to acquire displacement data of the front surface 3 along the line to cut 5 (measures displacement). The AF unit 212 drives the drive unit 232 according to the measured displacement, so as to move the converging optical system 204 to and fro in its optical axis direction along undulations of the front surface 3 of the object to be processed 1, and finely adjusts a distance between the converging optical system 204 and the object to be processed 1.

The AF unit 212 has at least an AF light source (measurement light source) 212a that outputs the AF laser light LB1, an AF dichroic mirror 238 that transmits therethrough the laser light L and reflects the AF laser light LB1 and the reflected light LB2, and a displacement detection part (measurement part) 212b that detects (measures) the displacement of the front surface 3 based on the reflected light LB2. The AF dichroic mirror 238 is arranged on the downstream side of the dichroic mirror 210 between the 4f optical system 241 and the converging optical system 204 in the optical path of the laser light L, and is arranged so as to change the directions of the AF laser light LB1 and the reflected light LB2 by 90°. The AF dichroic mirror 238 is a transmissive optical element arranged on the most downstream side in the optical path of the laser light L. That is, the AF unit 212 is configured so that the reflected light LB2 does not transmit through other transmissive optical elements such as other dichroic mirrors.

The direction and orientation in which the AF laser light LB1 enters into the AF dichroic mirror 238 are the same as the direction and orientation in which the visible light VL1 enters into the dichroic mirror 210. That is, the dichroic mirrors 210, 238 are provided so that their mirror surfaces are inclined in the same direction and at the same angle with respect to the optical axis of the laser light L. Thus, the surface observation unit 211 and the AF unit 212 are arranged on the same side (right side in the drawing) in the housing 231.

The optical path of the laser light L and the optical path of the AF laser light LB1 are common between the dichroic mirror 238 and the converging optical system 204. Thus, the converging optical system 204 converges the laser light L toward the object to be processed 1 to form a converging point (first converging point P1 described later), and converges the AF laser light LB1 toward the object to be processed 1 to form a converging point (second converging point P2 described later). Thus, the reflective spatial light modulator 203 is arranged on the optical path of the laser light L between the laser light source 202 and the converging optical system 204. Here, converging light toward the object to be processed 1 does not mean only converging light on the surface of the object to be processed 1 and to the inside of the object to be processed 1 but also means converging light between the converging optical system 204 and the object to be processed 1.

The laser processing device 200 includes the controller 250 that is used for controlling the entire laser processing device 200, is connected to the laser light source 202, the reflective spatial light modulator 203, the stage 111, the AF unit 212, and the drive unit 232, and controls these elements. The controller 250 is constituted mainly by a computer including, for example, a CPU (Central Processing Unit), a ROM (Read Only Memory), a RANI (Random Access Memory), and the like. The controller 250 executes various controls by executing a predetermined program on the computer. An example of the control of the controller 250 will be described.

The controller 250 controls the laser light source 202 and adjusts the output, pulse width, and the like of the laser light L emitted from the laser light source 202. When the controller 250 forms the modified region 7, the converging point P of the laser light L is located at a predetermined distance from the front surface 3 of the object to be processed 1, and controls at least one of the housing 231 and the stage 111 so that the converging point P of the laser light L moves relatively along the line to cut 5.

The controller 250 controls the reflective spatial light modulator 203 so that optical characteristics of the laser light L are predetermined optical characteristics. For example, when the modified region 7 is formed, a predetermined voltage is applied to each pair of electrode sections 214, 217 facing each other so that the aberration of the laser light L converged inside the object to be processed 1 is equal to or less than predetermined aberration, to control the reflective spatial light modulator 203. More specifically, the controller 250 inputs the modulation pattern, including an aberration correction pattern for shaping (modulating) a beam pattern (beam wavefront) of the laser light L entering the reflective spatial light modulator 203, to the reflective spatial light modulator 203. In other words, the controller 250 controls the modulation pattern presented to the reflective spatial light modulator 203. Then, a refractive index of the liquid crystal layer 216 corresponding to each pair of the electrodes 214, 217 is changed based on the input modulation pattern, to shape (modulate) the beam pattern (beam wavefront) of the laser light L emitted (reflected) from the reflective spatial light modulator 203. The other controls of the controller 250 will be described later.

As described above, the reflective spatial light modulator 203 is arranged on the optical path of the laser light L between the laser light source 202 and the converging optical system 204. In other words, the reflective spatial light modulator 203 does not intervene in the optical path of the AF laser light LB1. Therefore, the reflective spatial light modulator 203 modulates the laser light L, but does not modulate the AF laser light LB1. That is, the reflective spatial light modulator 203 modulates the laser light L independently of the AF laser light LB1. The controller 250 may be arranged outside the housing 231 as shown in the drawing, or may be installed inside the housing 231. In the controller 250, the modulation pattern to be presented to the reflective spatial light modulator 203 may be input serially thereto, or the modulation pattern stored in advance may be selected to be input thereto.

Here, the laser processing device 200 includes a pair of first mirrors 205a, 205b arranged between the laser light source 202 and the reflective spatial light modulator 203 in the optical path of the laser light L, and a pair of second mirrors 206a, 206b arranged between the reflective spatial light modulator 203 and the 4f optical system 241.

The first mirrors 205a, 205b reflect the laser light L, emitted by the laser light source 202, toward the reflective spatial light modulator 203. These first mirrors 205a, 205b are each arranged so as to change the direction of the laser light L by 90°. Specifically, the first mirror 205a on the upstream side reflects downward the laser light L entering from a right side in the horizontal direction, and the first mirror 205b on the downstream side reflects the laser light L, entering from above, on the right side in the horizontal direction.

The second mirrors 206a, 206b reflect the laser light L, reflected by the reflective spatial light modulator 203, toward the 4f optical system 241. Specifically, the second mirror 206a on the upstream side reflects upward the laser light L entering from diagonally below in the horizontal direction, and the second mirror 206b on the downstream side reflects the laser light L, entering from below, on the left side in the horizontal direction.

The mirrors 205a, 205b, 206a, 206b have an axis extending in a predetermined direction (the Y-axis direction in this case), and are configured to be rotatable around this axis. Thus, the mirrors 205a, 205b, 206a, 206b are configured so that their reflection directions (reflection angles) can be adjusted. Therefore, in the first mirrors 205a, 205b, the reflection directions thereof are appropriately adjusted, and the position and incident angle of the laser light L are adjusted so that the laser light L reliably enters the reflective spatial light modulator 203 at a predetermined incident angle. In the second mirrors 206a, 206b, the reflection directions thereof are appropriately adjusted, and the position and incident angle of the laser light L are adjusted so that the laser light L reliably enters the 4f optical system 241 at a predetermined incident angle.

The mirrors 205a, 205b, 206a, 206b may be configured so that the reflection direction is adjusted by electric means such as a piezoelectric element, or the reflection direction is adjusted by mechanical means such as a screw.

In the optical path of the laser light L, a beam expander 223 is arranged between the first mirror 205b on the downstream side and the reflective spatial light modulator 203. The beam expander 223 is for expanding the beam diameter of the laser light L, and has a concave lens 213a and a plano-convex lens 213b. The plano-convex lens 213b is removable and can be installed at a plurality of positions on the optical path of the laser light L in order to make a distance between the lenses 213a and 213b variable. Thus, by installing the plano-convex lens 213b at a desired position, the beam diameter of the laser light L can be expanded as desired.

In the optical path of the laser light L, an attenuator 207 is arranged between the first mirrors 205a, 205b. The attenuator 207 is for adjusting light intensity of the laser light L. The attenuator 207 is configured to include a polarizing plate 207a for obtaining linearly polarized light and a λ/2 wave plate 207b for changing a polarization direction.

In the optical path of the laser light L, a 212 wave plate 228 for changing the polarization direction is arranged between the second mirrors 206a and 206b. The λ/2 wave plate 228 makes it possible to make the polarization direction of the laser light L correspond to a processing progress direction (direction along the line to cut 5).

When the object to be processed 1 is cut using the laser processing device 100 configured as described above, first, for example, an expanding tape is stuck to a rear face of the object to be processed 1, and the object to be processed 1 is placed on the stage 111. Subsequently, the converging point P is set within the object to be processed 1 from the front surface 3 of the object to be processed 1, the laser light L is irradiated, and the modified region 7 is formed inside the object to be processed 1 along the line to cut 5. At this time, the position of the converging point P is adjusted by driving the drive unit 232 according to the displacement of the front surface 3 measured by the AF unit 212. Then, the expanding tape is expanded. Thus, the object to be processed 1 is accurately cut along the line to cut 5 with the modified region 7 as the starting point of cutting, so that a plurality of semiconductor chips are separated from each other.

Here, the laser light L emitted from the laser light source 202 travels in the horizontal direction in the housing 231 and is then reflected downward by the first mirror 205a, and the light intensity is adjusted by the attenuator 207. After that, the laser light L is reflected in the horizontal direction by the first mirror 205b, the beam diameter is expanded by the beam expander 223, and the laser light L enters the reflective spatial light modulator 203.

The laser light L entering the reflective spatial light modulator 203 is modulated (corrected) so that the aberration of the laser light L converged inside the object to be processed 1 by the reflective spatial light modulator 203 is equal to or less than predetermined aberration, and the laser light L is emitted diagonally upward in the horizontal direction. Then, after the laser light L is reflected upward by the second mirror 206a, the polarization direction is changed by the λ/2 wave plate 228, and the laser light L is reflected in the horizontal direction by the second mirror 206b and enters the 4f optical system 241.

The wavefront form of the laser light L entering the 4f optical system 241 is adjusted so that the laser light L entering the converging optical system 204 becomes parallel light. Specifically, the laser light L is converged by transmitting through the first lens 241a, and is reflected downward by a mirror 219. Then, the laser light L diverges at a confocal point O, crosses the optical path between the first mirror 205b and the reflective spatial light modulator 203, and then transmits through the second lens 241b, so as to be converged again to become parallel light.

Then, the laser light L transmits through the dichroic mirrors 210, 218 in sequence, so as to enter the converging optical system 204, thereby being converged into the object to be processed 1, mounted on the stage 111, by the converging optical system 204.

Subsequently, the autofocus processing (hereinafter, referred to as "AF processing") in the laser processing device 200 will be described. In the AF unit 212, a beam shape of the reflected light LB2 changes on a 4-quadrant detector of the displacement detection part 212b due to the displacement of the front face (the entrance surface of the laser light L and the AF laser light LB1) 3 from a reference position described later in the object to be processed 1. Specifically, the reflected light LB2 reflected on the front surface 3 has a different beam spread angle according to the displacement of the front surface 3, and has a different beam shape depending on the beam spread angle. The displacement detection part 212b divides the beam shape, which changes as described above, into four light receiving surfaces of the 4-quadrant detector and detects the displacement. When the four light receiving surfaces are light receiving surfaces $S_A$, $S_B$, $S_C$, $S_D$, and output values corresponding to amounts of light on the respective light receiving surfaces $S_A$, $S_B$, $S_C$, $S_D$ are output values $I_A$, $I_B$, $I_C$, $I_D$, respectively, an error signal is generated in the AF unit 212 by calculation of $[(I_A+I_C)-(I_B+I_D)]/[(I_A+I_B+I_C+I_D)]$.

Figure 9:
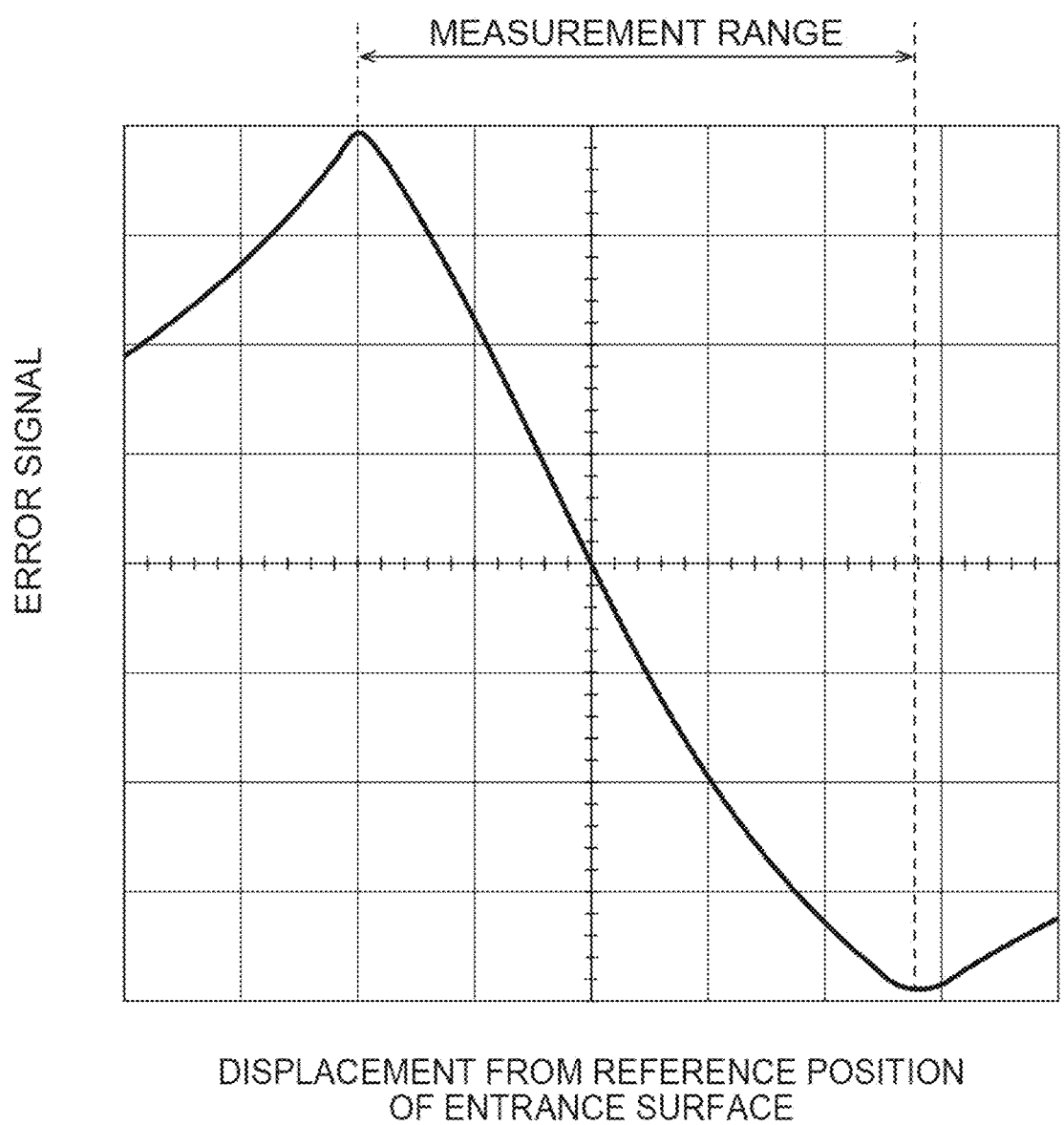
FIG. 9 is a graph showing an example of a calculated value of an error signal.

FIG. 9 is a graph showing an example of a calculated value of the error signal. In the graph shown in FIG. 9, the horizontal axis shows displacement from a position where the error signal on the entrance surface becomes zero, and the vertical axis shows a magnitude of the error signal. It means that as the displacement becomes smaller (toward the left-hand side of the drawing), the entrance surface is located in a direction closer to the converging optical system 204. As the displacement becomes larger (toward the right-hand side of the drawing), the laser light entrance surface is located in a direction away from the converging optical system 204.

As shown in FIG. 9, the error signal changes in an S-shaped curve on the graph. The displacement when the error signal becomes zero is the displacement when the beam shape becomes a perfect circle on the 4-quadrant detector. A usable range in the error signal is a range in which a monotonous decrease occurs around zero (hereinafter, this range is referred to as the "measurement range"). That is, a range in which the displacement of the entrance surface can be suitably measured is limited to a predetermined range (measurement range) along the optical axis of the AF laser light LB1. The reference position is, for example, a position of the front surface 3 when the front surface 3 is imaged by the surface observation unit 211 and a contrast of a projected reticle is maximized.

Figure 10:
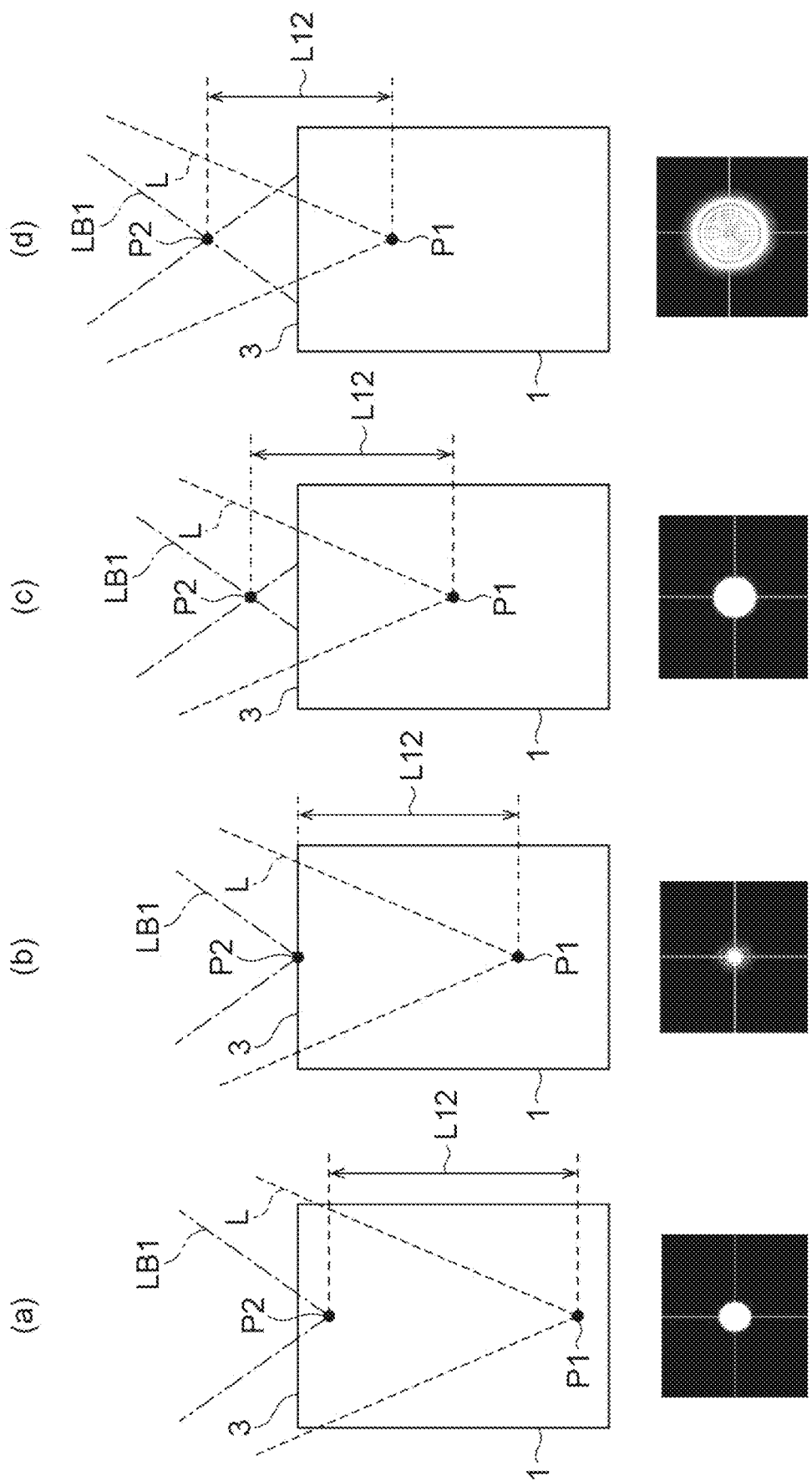
FIG. 10 is a schematic diagram showing a relationship between a converging point of processing laser light and a converging point of AF laser light.

FIG. 10 is a schematic diagram showing a relationship between the converging point of the processing laser light and the converging point of the AF laser light. As shown in FIG. 10, in the laser processing device 200, the laser light L and the AF laser light LB1 are applied to the object to be processed 1 with their optical axes aligned with each other. The first converging point P1 that is the converging point P of the laser light L and the second converging point P2 that is the converging point of the AF laser light LB1 are separated from each other, and the distance between these converging points is a distance L12 and is substantially constant attributable to the configuration of the laser processing device 200 (there are variations due to individual differences in the laser processing device 200).

Therefore, as shown in FIGS. 10(a) to (d), when the first converging point P1 is moved from a deep position (a position far from the front surface 3 that is the entrance surface) to a shallow position (a position close to the front surface 3), the second converging point P2 also moves by the same distance. Along with this, the spot size on the front surface 3 of the AF laser light LB1 is also changed. That is, when the first converging point P1 and the second converging point P2 move so that a state as shown in FIG. 10(a) in which the second converging point P2 is relatively close to the front surface 3 and is located in the object to be processed 1 changes to a state as shown in FIG. 10(b) in which the second converging point P2 coincides with the front surface 3, the spot size on the front surface 3 of the AF laser light LB1 is reduced. In addition, from the state shown in FIG. 10(b), as shown in FIGS. 10(c) and (d), when the first converging point P1 and the second converging point P2 move so that the second converging point P2 gradually moves away from the front surface 3 outside the object to be processed 1, the spot size of the AF laser light LB1 on the front surface 3 increases.

As described above, when the range in which the displacement of the front surface 3 can be suitably measured is limited to the measurement range, as a result, a range of a processing depth that AF processing can be performed is also limited when the distance L12 between the first converging point P1 of the laser light L and the second converging point P2 of the AF laser light LB1 is constant. Therefore, it is effective to make it possible to change the distance L12 between the first converging point P1 and the second converging point P2.

Figure 11:
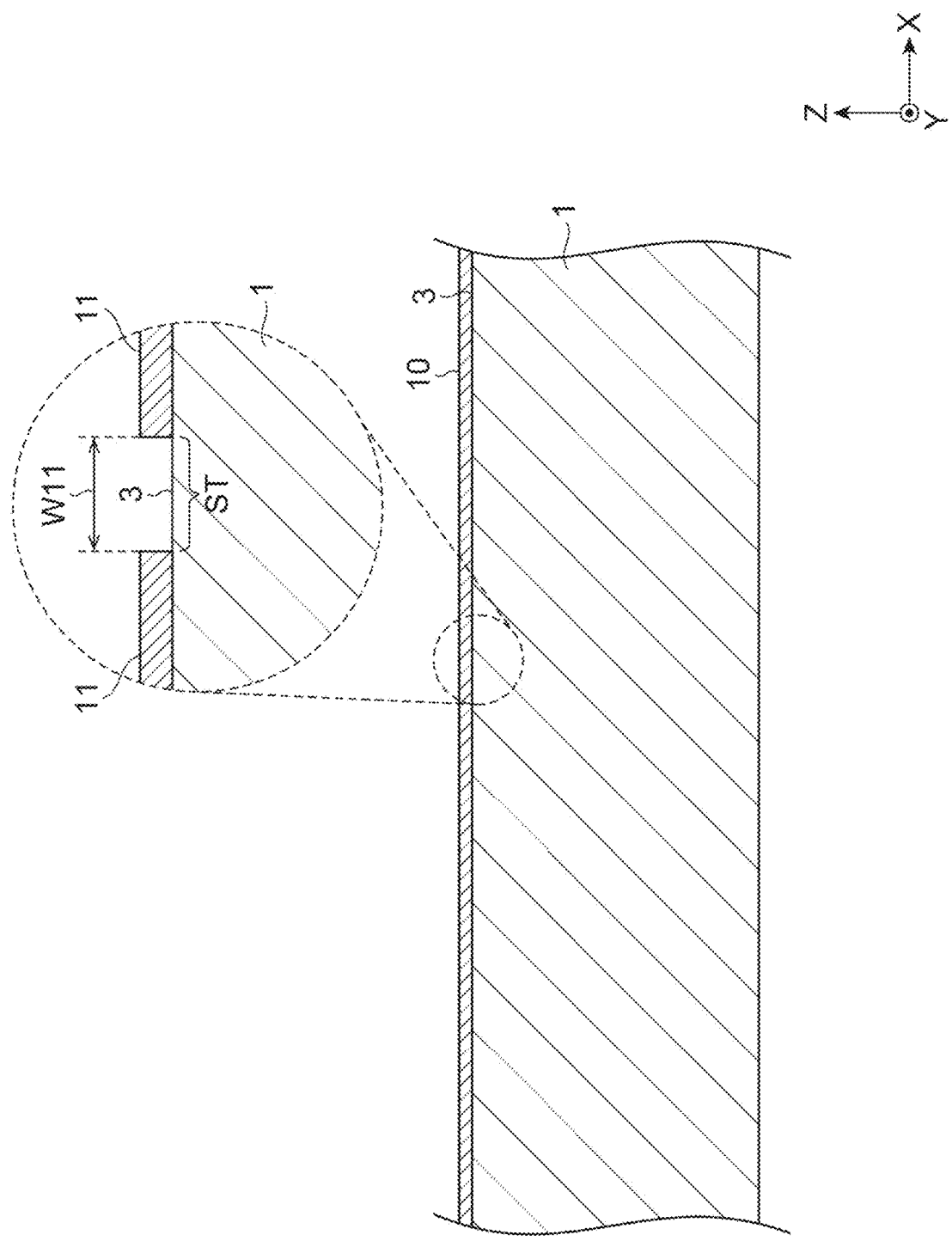
FIG. 11 is a partial cross-sectional view of the object to be processed.

On the other hand, the object to be processed 1 of the laser processing device 200 may be an object to be processed as shown in FIG. 11. A device layer 10 is formed on the front surface 3 of the object to be processed 1 shown in FIG. 11. The device layer 10 includes a plurality of device portions 11 aligned two-dimensionally on the front surface 3 so as to be separated from each other. The device portion 11 is, for example, a semiconductor operating layer formed by crystal growth, a light receiving element such as a photodiode, a light emitting element such as a laser diode, or a circuit element formed as a circuit. A street ST that is a region where the front surface 3 is exposed is provided between the device portions 11 adjacent to each other. The street ST is provided, for example, in a lattice pattern. The line to cut 5 is set to the street ST (that is, the line to cut 5 is set to pass between the device portions 11 adjacent to each other).

When the displacement of the front surface 3 of the object to be processed 1 is measured and the processing (AF processing) is performed while adjusting the position of the first converging point P1 based on the displacement, in the street ST (between the device portions adjacent to each other), the spot of the AF laser light LB1 is arranged on the front surface 3. At this time, in order to measure the displacement of the front surface 3 with high accuracy, it is desirable that the AF laser light LB1 having a predetermined spread from the second converging point P2 (or toward the second converging point P2) be prevented from interfering with the device portion 11. On the other hand, in order to form the modified region 7 at a suitable position, it is necessary to arrange the first converging point P1 at a desired processing depth. Therefore, from such a viewpoint, it is effective to make it possible to change the distance L12 between the first converging point P1 and the second converging point P2.

Figure 12:
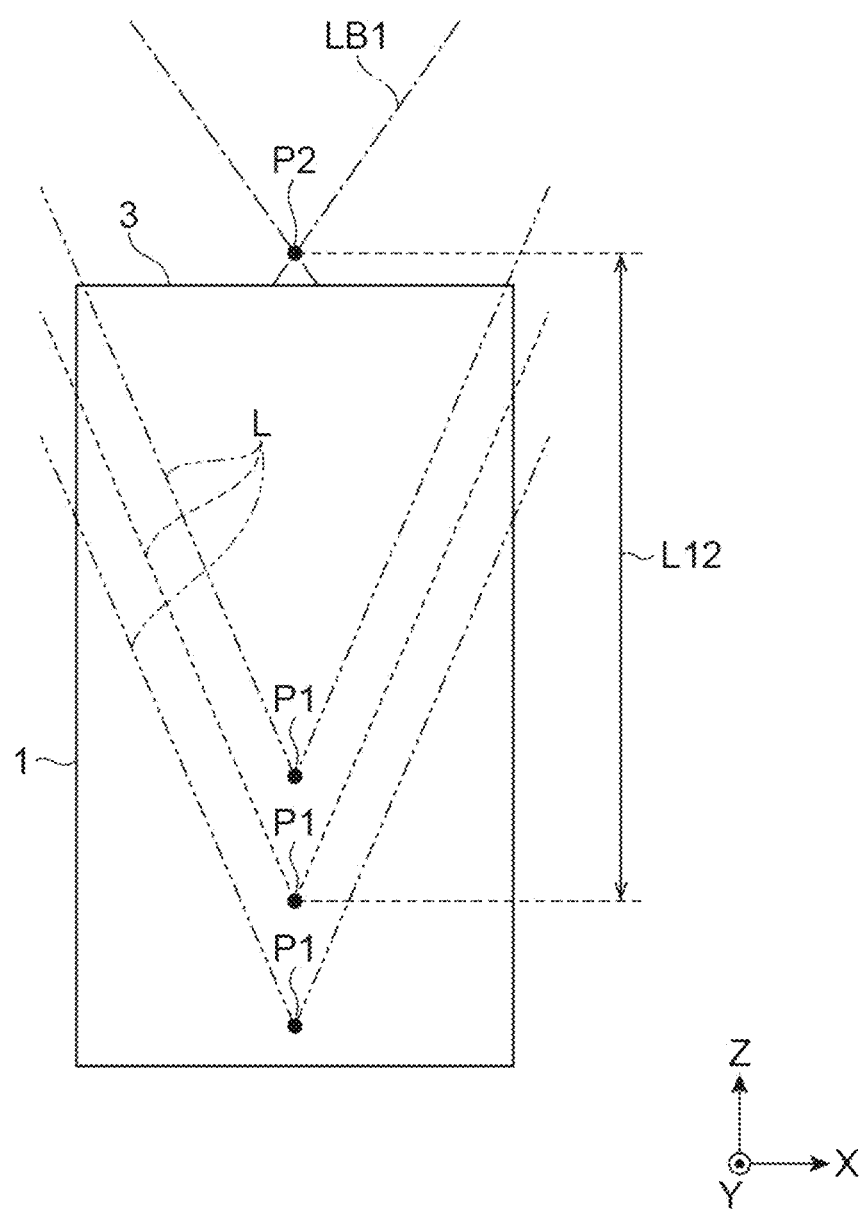
FIG. 12 is a schematic diagram showing a state in which a position of a first converging point is changed.

Thus, the laser processing device 200 has a function of changing the position of the first converging point P1 independently of the second converging point P2. That is, as shown in FIG. 12, the laser processing device 200 maintains the position of the second converging point P2 constant in a direction (in this case, the Z-axis direction) intersecting the front surface 3 and makes it possible to change the position of the first converging point P1. Thus, the controller 250 causes the reflective spatial light modulator 203 to present a modulation pattern including a converging position change pattern for changing the position of the first converging point P1 in the Z-axis direction. As described above, the reflective spatial light modulator 203 intervenes only in the optical path of the laser light L. Therefore, only the position of the first converging point P1 is changed, and the distance L12 between the first converging point P1 and the second converging point P2 is changed. Thus, it is possible to arrange the first converging point P1 at a desired processing depth while setting the second converging point P2 at a position suitable for measuring the displacement of the front surface 3.

More specifically, the controller 250 sets the second converging point P2 at the position suitable for measuring the displacement of the front surface 3 according to a street width W11 (an interval between edges of device portions adjacent to each other: see FIG. 11), the distance L12 between the first converging point P1 and the second converging point P2, and the processing depth of desired laser processing from the front surface 3 that is the entrance surface, and meanwhile causes the reflective spatial light modulator 203 to present the modulation pattern including the converging position change pattern for changing the position (that is, the distance L12) of the first converging point P1, so as to arrange the first converging point P1 at a desired processing depth.

In addition, as will be described in detail later, when the AF laser light LB1 interferes with the device portion 11 in an initial state in which the first converging point P1 is arranged at the processing depth and the spot of the AF laser light LB1 is arranged on the front surface 3 in the street ST, the controller 250 causes the reflective spatial light modulator 203 to present the modulation pattern including the converging position change pattern. At this time, the controller 250 moves the second converging point P2 so that the AF laser light LB1 does not interfere with the device portion 11 when the AF laser light LB1 interferes with the device portion 11 in the initial state, calculates a difference between the first converging point P1, shifted from the processing depth due to the movement of the second converging point P2, and the processing depth, and causes the reflective spatial light modulator 203 to present the modulation pattern including the converging position change pattern according to the difference.

With reference to the distance L12 between the first converging point P1 and the second converging point P2 in a state of being modulated (or unmodulated) by the reflective spatial light modulator 203 in a state in which the modulation pattern that does not include the converging position change pattern is presented, it is possible to enlarge the distance L12 between the first converging point P1 and the second converging point P2 according to the converging position change pattern, and change the position of the first converging point P1 from the front surface 3 of the object to be processed 1 to a deeper position, and to reduce the distance L12 and change the position of the first converging point P1 to a shallower position. The controller 250 causes the reflective spatial light modulator 203 to present the modulation pattern formed by superimposing the converging position change pattern and another pattern such as an aberration correction pattern for aberration correction and thereby can realize a plurality of functions at the same time.

Figure 13:
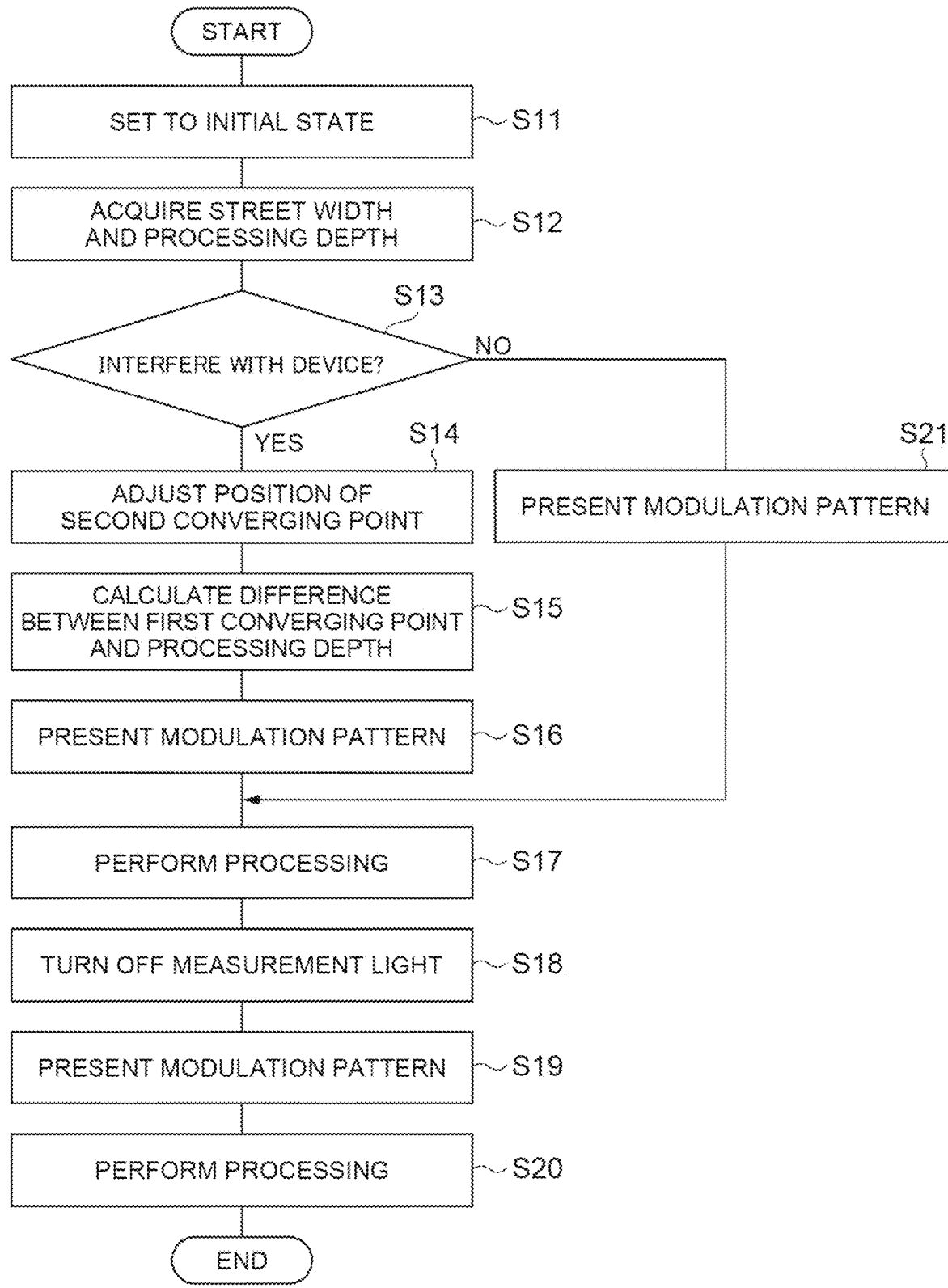
FIG. 13 is a flowchart showing a series of steps of AF processing.

Subsequently, details of the AF processing in the laser processing device 200 will be described. FIG. 13 is a flowchart showing a series of steps of the AF processing. As shown in FIG. 13, in this case, first, when the AF processing is started, the state of the reflective spatial light modulator 203 is set to the initial state (step S11). For example, if the modulation pattern including the aberration correction pattern in the past AF processing, and the like is presented to the reflective spatial light modulator 203, the presentation of the modulation pattern is stopped, and the state is changed to a state in which the modulation pattern is not presented to the reflective spatial light modulator 203.

Figure 14:
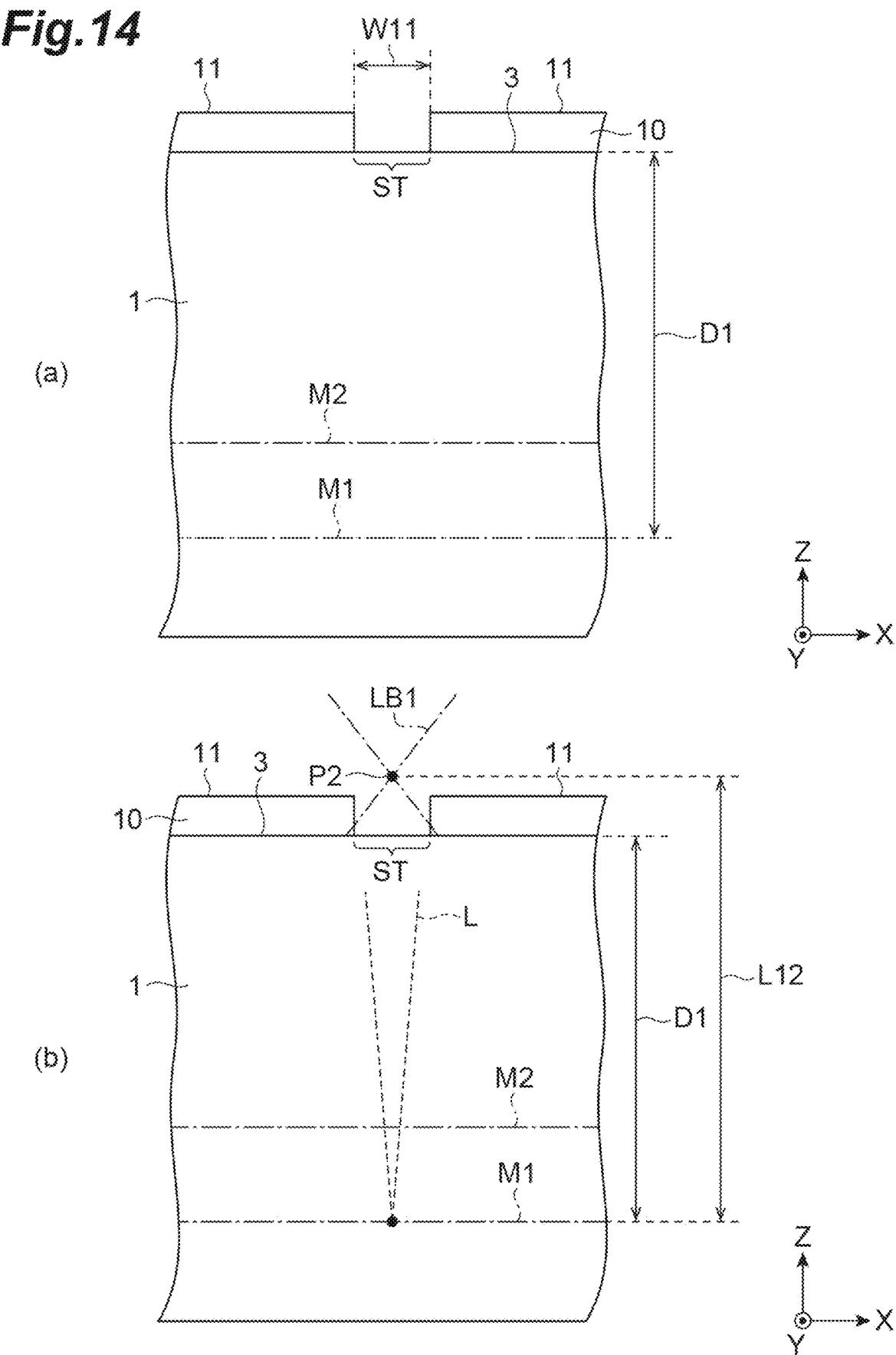
FIG. 14 is a schematic cross-sectional view showing a series of steps of the AF processing.

Subsequently, the controller 250 acquires the street width W11 and the processing depth (step S12). As shown in FIG. 14(a), in this case, the device layer 10 is formed on the front surface 3 that is the entrance surface of the object to be processed 1, and the street width W11 is acquired as the interval between the edges facing each other of the device portions 11. In this case, the modified regions 7 are formed at two different positions in a depth direction (the direction intersecting the front surface 3 and the Z-axis direction) of the object to be processed 1 with respect to the object to be processed 1. Thus, two positions to process M1, M2 are set for the object to be processed 1. The position to process M1 is a position farther (deeper) from the front surface 3 than the position to process M2, and is a position where processing is performed (first) prior to the position to process M2. In this case, the processing depth D1 that is the distance from the front surface 3 of the position to process M1 farthest from the front surface 3 is acquired.

Subsequently, as shown in FIG. 13, the controller 250 determines whether or not the AF laser light LB1 interferes with the device portion 11 (step S13). In this case, as shown in FIG. 14(b), in the initial state in which the first converging point P1 of the laser light L is arranged at the processing depth D1 and the spot of the AF laser light LB1 is arranged on the front surface 3 in the street ST, whether or not the AF laser light LB1 interferes with the device portion 11 is determined.

Figure 15:
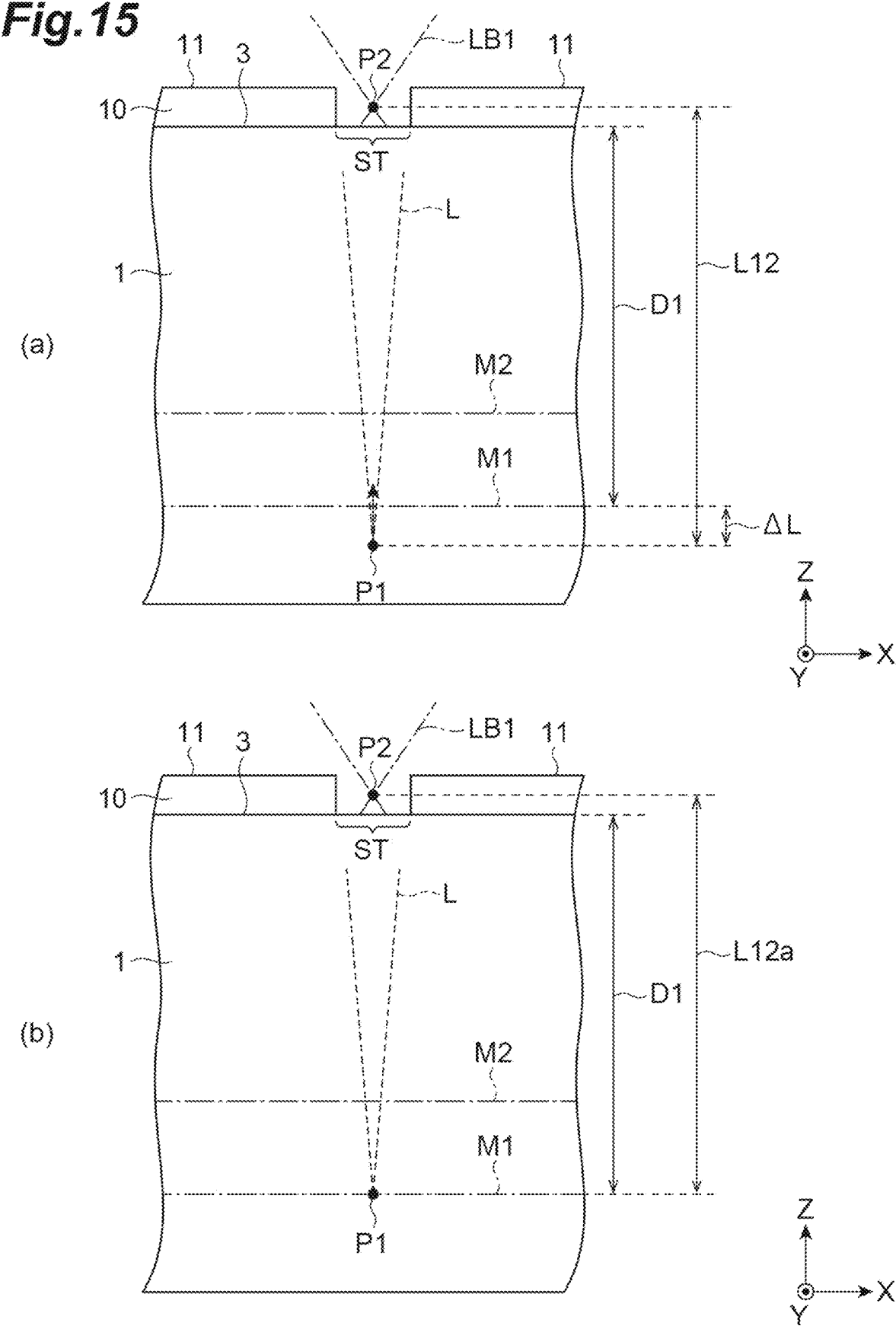
FIG. 15 is a schematic cross-sectional view showing a series of steps of the AF processing.

Subsequently, as shown in FIG. 13, as a result of the determination of step S13, when the AF laser light LB1 interferes with the device portion 11 (step S13: YES), the controller 250 adjusts the position of the second converging point P2 (step S14). In this case, as shown in FIG. 15(a), while the distance between the first converging point P1 and the second converging point P2 is maintained at the distance L12 (that is, the modulation pattern including the converging position change pattern is not presented), the second converging point P2 is moved so that the AF laser light LB1 does not interfere with the device portion 11. For example, in the examples of FIG. 14(b) and FIG. 15(a), the AF laser light LB1 interferes with the device portion 11 while spreading from the second converging point P2 in a state in which the second converging point P2 is separated from the front surface 3 outside the object to be processed 1. Therefore, in this case, the position of the second converging point P2 is adjusted so as to bring the second converging point P2 closer to the front surface 3 and reduce the spot of the AF laser light LB1 on the front surface 3. Along with this, the first converging point P1 also shifts from the position to process M1 to the side opposite to the front surface 3.

Subsequently, as shown in FIGS. 13 and 15(a), the controller 250 calculates a difference (shift amount) ΔL between the first converging point P1 shifted from the position to process M1 and the processing depth D1 at the position to process M1 (step S15).

Subsequently, the controller 250 causes the reflective spatial light modulator 203 to present the modulation pattern formed by superimposing the converging position change pattern according to the difference ΔL calculated in step S15 and the aberration correction pattern for aberration correction according to the processing depth D1 (step S16). In this case, the converging position change pattern is set so that the first converging point P1 is moved toward the front surface 3 side by the difference ΔL. The position of the second converging point P2 is kept constant. Thus, the distance L12 between the first converging point P1 and the second converging point P2 is changed to a distance L12a. In this case, the distance L12a is smaller than the distance L12 by the difference ΔL. Thus, the AF laser light LB1 does not interfere with the device portion 11, and the first converging point P1 coincides with the position to process M1.

Subsequently, as shown in FIGS. 13 and 16, the controller 250 performs processing by the laser light L (step S17). In this case, the first converging point P1 and the second converging point P2 move with respect to the object to be processed 1 along the line to cut 5, whereby the displacement of the front surface 3 is measured by the AF laser light LB1, the position of the first converging point P1 is adjusted according to the measured displacement, and the modified region 7 is formed by irradiation with the laser light L. In this case, the laser light L is scanned along the Y-axis direction at the position to process M1. Thus, at the position to process M1, a row of modified regions 7 extending along the Y-axis direction is formed. At this time, the displacement of the front surface 3 along the line to cut 5 is acquired and held.

Subsequently, the controller 250 turns off the AF laser light LB1 (step S18). This is because the AF processing can be performed by reproducing displacement information of the front surface 3 acquired and held in step S17 during the subsequent AF processing at the position to process M2. Subsequently, in a state in which the controller 250 positions the first converging point P1 of the laser light L at the position to process M2 of the processing depth D2, the controller 250 causes the reflective spatial light modulator 203 to present the modulation pattern including the aberration correction pattern for aberration correction according to the processing depth D2 (step S19). Then, as shown in FIGS. 13 and 17, the AF processing is performed at the position to process M2 in the same manner as the processing at the position to process M1 (step S20). Thus, a plurality of rows of modified regions 7 are formed for the object to be processed 1.

On the other hand, as shown in FIG. 13, as a result of the determination in step S13, when the AF laser light LB1 does not interfere with the device portion 11 (step S13: NO), the controller 250 causes the reflective spatial light modulator 203 to present the modulation pattern including the aberration correction pattern for aberration correction according to the processing depth D1 (step S21). After that, the process proceeds to step S17.

As described above, in the laser processing device 200, the converging optical system 204 converges the laser light L output from the laser light source 202 and the AF laser light LB1 output from the AF light source 212a toward the object to be processed 1. Thus, the first converging point P1 as the converging point P of the laser light L is formed, and the second converging point P2 of the AF laser light LB1 is formed. The displacement detection part 212b measures the displacement of the front surface 3 based on the reflected light LB2 of the AF laser light LB1 on the front surface 3. In addition, the drive unit 232 adjusts the position of the first converging point P1 in the direction (for example, the Z-axis direction) intersecting (orthogonal to) the front surface 3 according to the measurement result. That is, in the laser processing device 200, AF processing can be performed.

Here, in the laser processing device 200, the reflective spatial light modulator 203 that modulates the laser light L between the laser light source 202 and the converging optical system 204 is used. The reflective spatial light modulator 203 presents the modulation pattern including the converging position change pattern for changing the position of the first converging point P1 in the direction intersecting the front surface 3 based on the distance between the first converging point P1 and the second converging point P2 and a desired processing depth under the control of the controller 250. Thus, the first converging point P1 of the processing laser light L can be changed independently of the second converging point P2 of the AF laser light LB1. As described above, according to the laser processing device 200, a range in which the AF processing is possible can be enlarged with a simple configuration without requiring a complicated configuration such as mechanically movement of a lens group.

In this case, on the front surface 3 of the object to be processed 1, the plurality of device portions 11 aligned so as to be separated from each other along the front surface 3 are formed, and the line to cut 5 is set to pass between the device portions 11 adjacent to each other (street ST). Then, in the laser processing device 200, when the AF laser light LB1 interferes with the device portion 11 in an initial state in which the first converging point P1 is arranged at the processing depth D1 and the spot of the AF laser light LB1 is arranged on the front surface 3 in the street ST, the controller 250 causes the spatial light modulator to present the modulation pattern including the converging position change pattern. Thus, while preventing the AF laser light LB1 from interfering with the device portion 11, it is possible to adjust the position of the first converging point P1 of the laser light L to the desired processing depth D1 and to perform highly accurate AF processing.

At this time, in the laser processing device 200, the controller moves the second converging point P2 so that the AF laser light LB1 does not interfere with the device portion 11 when the AF laser light LB1 interferes with the device portion 11 in the initial state, calculates the difference ΔL between the first converging point P1 shifted due to the movement of the second converging point P2 and the processing depth D1, and causes the reflective spatial light modulator 203 to present the modulation pattern including the converging position change pattern according to the difference ΔL.

In the laser processing device 200, the controller 250 causes the reflective spatial light modulator 203 to present the modulation pattern formed by superimposing the aberration correction pattern for aberration correction of the laser light L and the converging position change pattern. As described above, when the reflective spatial light modulator 203 is used to the change the position of the first converging point P1 of the laser light L, it is possible to change the position at the same time as the aberration correction, and the range in which the AF processing is possible can be enlarged with a simpler configuration.

The above embodiment describes an embodiment of the laser processing device according to one aspect of the present disclosure. Therefore, the laser processing device according to one aspect of the present disclosure is not limited to the laser processing device 200 described above. The laser processing device according to one aspect of the present disclosure may be an arbitrary modification of the laser processing device 200 described above.

For example, in the laser processing device 200, the controller 250 can perform the following control in addition to the control of the modulation pattern and the reflective spatial light modulator 203 in the AF processing described above.

Figure 18:
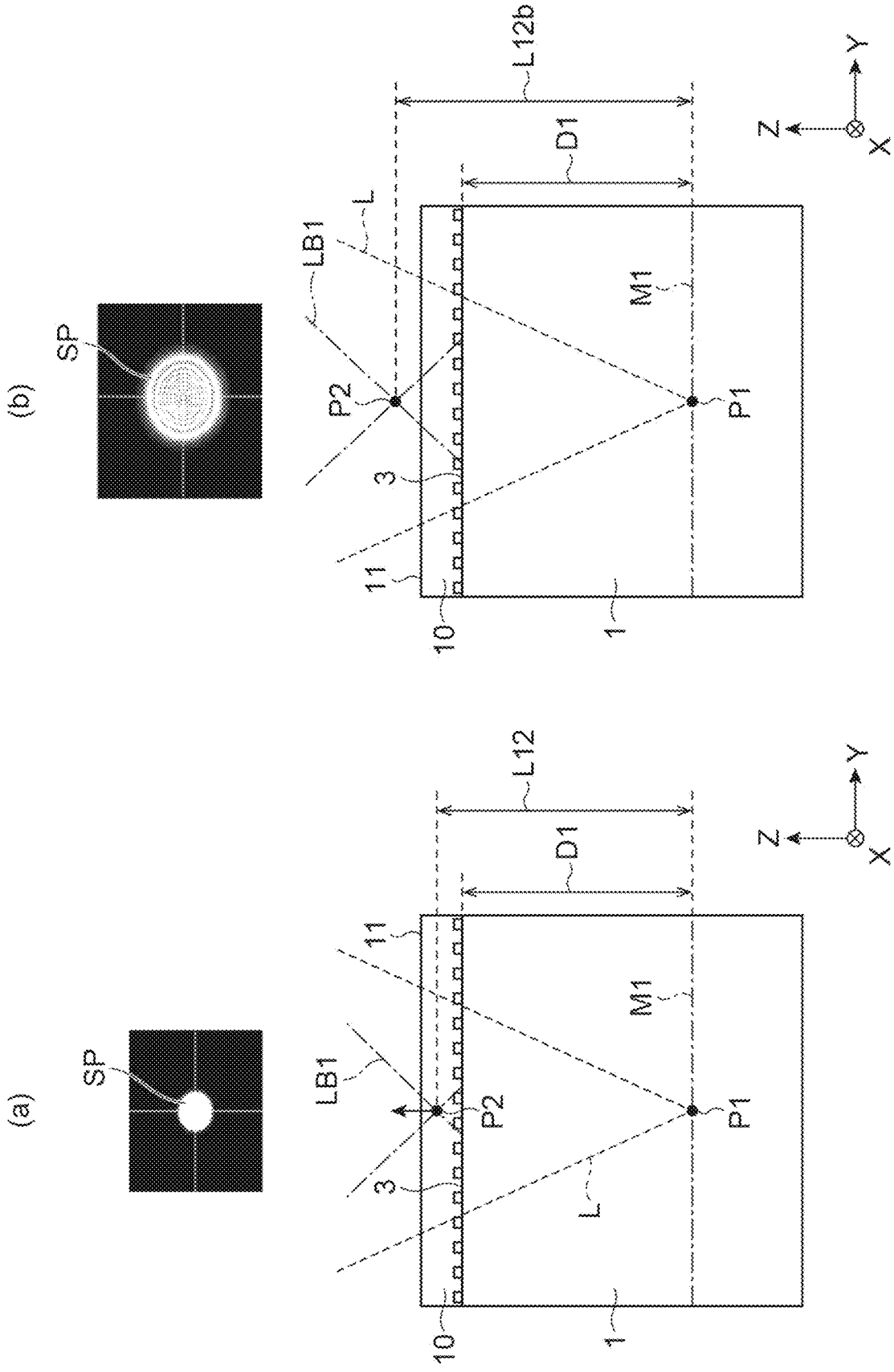
FIG. 18 is a schematic cross-sectional view for explaining a control according to a modified example.

FIG. 18 is a schematic cross-sectional view for explaining a control according to a modified example. As shown in FIG. 18, the front surface 3 that is the entrance surface of the laser light L and the AF laser light LB1 in the object to be processed 1 may be rough. When the roughness of the front surface 3 is equal to or greater than a certain level, if the spot SP of the AF laser light LB1 arranged on the front surface 3 is small, a measurement error tends to be large due to an influence of the roughness. It means that a geometric size of the roughness pattern is approximately ½ times or more a spot size of laser light for measurement.

In the laser processing device 200, when the roughness of the front surface 3 is equal to or greater than a certain level, the controller 250 causes the reflective spatial light modulator 203 to present the modulation pattern including the converging position change pattern to enlarge or reduce (enlarge to a distance L12b in this case) the distance L12 so as to enlarge the size of the spot SP of the AF laser light LB1 on the front surface 3 while maintaining the first converging point P1 at the processing depth D1. Thus, even when the roughness of the front surface 3 is equal to or greater than a certain level, it is possible to perform highly accurate AF processing.

In the above embodiment, the laser processing is exemplified in which the modified region 7 used for cutting the object to be processed 1 is formed inside the object to be processed 1. However, the laser processing by the laser processing device 200 is not limited to this.

INDUSTRIAL APPLICABILITY

It is possible to provide a laser processing device capable of enlarging a range in which autofocus processing is possible with a simpler configuration.

REFERENCE SIGNS LIST

1 Object to be processed
3 Front face (entrance surface)
5 Line to cut (line to process)
11 Device portion
200 Laser processing device
202 Laser light source
203 Reflective spatial light modulator (spatial light modulator)
204 Converging optical system (converging unit)
212a AF light source (measurement light source)
212b Displacement detection part (measurement part)
250 Controller
L Laser light
LB1 AF laser light (measurement light)
LB2 Reflected light.

The invention claimed is:
1. A laser processing device configured to apply laser light to an object to be processed along a line to process, to perform laser processing on the object to be processed along the line to process, the laser processing device comprising:
a laser light source configured to output the laser light;
a measurement light source configured to output measurement light;
a converging unit configured to converge the laser light toward the object to be processed to form a first converging point and converges the measurement light toward the object to be processed to form a second converging point;
a measurement part configured to measure displacement of an entrance surface according to reflected light of the measurement light on the entrance surface of the laser light and the measurement light in the object to be processed;
an adjustment unit configured to adjust a position of the first converging point in a direction intersecting the entrance surface according to a measurement result of the displacement of the entrance surface;
a spatial light modulator configured to modulate the laser light according to a modulation pattern between the laser light source and the converging unit; and
a controller configured to control the modulation pattern presented to the spatial light modulator,
wherein the controller causes the spatial light modulator to present the modulation pattern including a converging position change pattern for changing a position of the first converging point in the direction intersecting the entrance surface according to a distance between the first converging point and the second converging point and a processing depth of the laser processing from the entrance surface so as to change the distance between the first converging point and the second converging point in the direction intersecting the entrance surface,
wherein in a first control, the controller adjusts a position of the second converging point in the direction intersecting the entrance surface so that the measurement light does not interfere with a device portion formed on the entrance surface while the distance between the first converging point and the second converging point is maintained by not presenting the converging position changing pattern,
wherein after the first control, in a second control the controller adjusts a position of the first converging point in the direction intersecting the entrance surface so that the first converging point is positioned on a processing position while the position of the second converging point is maintained by presenting the converging position changing pattern, and wherein after processing using the positions adjusted in the first control and the second control on one line to process, when processing is performed on the same line to process and at a different depth, the controller turns off the measurement light and performs said processing by reproducing displacement information of the entrance surface.

2. The laser processing device according to claim 1,
wherein a plurality of device portions aligned so as to be separated from each other along the entrance surface are formed on the entrance surface of the object to be processed, the line to process is set so as to pass between the device portions adjacent to each other, and the controller causes the spatial light modulator to present the modulation pattern including the converging position change pattern when the measurement light interferes with the device portion in an initial state in which the first converging point is arranged at the processing depth and a spot of the measurement light is arranged on the entrance surface between the device portions adjacent to each other.

3. The laser processing device according to claim 2,
wherein the controller moves the second converging point so that the measurement light does not interfere with the device portion when the measurement light interferes with the device portion in the initial state, calculates a difference between the first converging point shifted due to movement of the second converging point and the processing depth, and causes the spatial light modulator to present the modulation pattern including the converging position change pattern according to the difference.

4. The laser processing device according to claim 1,
wherein when roughness of the entrance surface is equal to or greater than a certain level, the controller causes the spatial light modulator to present the modulation pattern including the converging position change pattern to enlarge or reduce the distance so as to enlarge a spot size of the measurement light on the entrance surface while maintaining the first converging point at the processing depth.

5. The laser processing device according to claim 1,
wherein the controller causes the spatial light modulator to present the modulation pattern formed by superimposing an aberration correction pattern for aberration correction of the laser light and the converging position change pattern.

\* \* \* \* \*